(12) United States Patent
Channon et al.

(10) Patent No.: US 11,747,529 B2
(45) Date of Patent: Sep. 5, 2023

(54) WAFER LEVEL MICROSTRUCTURES FOR AN OPTICAL LENS

(71) Applicant: STMicroelectronics (Research & Development) Limited, Marlow (GB)

(72) Inventors: Kevin Channon, Edinburgh (GB); James Peter Drummond Downing, Doune (GB); Andy Price, Bonnyrigg (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 0 days.

(21) Appl. No.: 17/520,317

(22) Filed: Nov. 5, 2021

(65) Prior Publication Data

US 2022/0057553 A1    Feb. 24, 2022

Related U.S. Application Data

(62) Division of application No. 16/594,742, filed on Oct. 7, 2019, now Pat. No. 11,187,837, which is a division
(Continued)

(51) Int. Cl.
*G02B 5/18* (2006.01)
*G02B 1/14* (2015.01)
(Continued)

(52) U.S. Cl.
CPC ............ *G02B 5/1866* (2013.01); *G02B 1/115* (2013.01); *G02B 1/14* (2015.01); *G02B 5/1847* (2013.01); *G01S 7/4811* (2013.01)

(58) Field of Classification Search
CPC ...... G02B 5/18; G02B 5/3025; G02B 5/3058; G02B 6/124; G02B 5/1866; G02B 1/14; G02B 1/115; G02B 5/1847
(Continued)

(56) References Cited

U.S. PATENT DOCUMENTS 5,074,629 A    12/1991  Zdeblick
5,119,231 A     6/1992  Nelson et al.
(Continued)

FOREIGN PATENT DOCUMENTS

EP    2 487 718 A2    8/2012
EP    2 492 716 A1    8/2012
WO    WO 2013093741 A1    6/2013

*Primary Examiner* — Audrey Y Chang
(74) *Attorney, Agent, or Firm* — SEED IP LAW GROUP LLP

(57) ABSTRACT

Various embodiments provide an optical lens that includes wafer level diffractive microstructures. In one embodiment, the optical lens includes a substrate, a microstructure layer having a first refractive index, and a protective layer having a second refractive index that is different from the first refractive index. The microstructure layer is formed on the substrate and includes a plurality of diffractive microstructures. The protective layer is formed on the diffractive microstructures. The protective layer provides a cleanable surface and encapsulates the diffractive microstructures to prevent damage and contamination to the diffractive microstructures. In another embodiment, the optical lens includes a substrate and an anti-reflective layer. The anti-reflective layer is formed on the substrate and includes a plurality of diffractive microstructures.

15 Claims, 16 Drawing Sheets

Related U.S. Application Data of application No. 15/357,837, filed on Nov. 21, 2016, now Pat. No. 10,473,834.

(51) Int. Cl.
*G02B 1/115* (2015.01)
*G01S 7/481* (2006.01)

(58) Field of Classification Search
USPC .......................................... 359/569, 576, 565
See application file for complete search history.

(56) References Cited

U.S. PATENT DOCUMENTS

| | | | |
|---|---|---|---|
| 5,390,085 A | 2/1995 | Mari-Roca et al. | |
| 5,561,558 A * | 10/1996 | Shiono | G02B 6/124 359/569 |
| 5,781,164 A | 7/1998 | Jacobsen et al. | |
| 6,157,488 A | 12/2000 | Ishii | |
| 6,545,821 B2 | 4/2003 | Katsuma | |
| 6,741,394 B1 | 5/2004 | Tanitsu et al. | |
| 6,762,880 B2 | 7/2004 | Holm et al. | |
| 7,656,585 B1 | 2/2010 | Powell et al. | |
| 7,670,758 B2 | 3/2010 | Wang et al. | |
| 8,270,079 B1 | 9/2012 | Mossberg et al. | |
| 8,723,768 B2 | 5/2014 | Egi et al. | |
| 8,765,360 B2 * | 7/2014 | Wang | G02B 5/18 359/569 |
| 9,511,553 B2 | 12/2016 | Ozaki et al. | |
| 11,150,388 B2 | 10/2021 | Farys et al. | |
| 11,187,837 B2 | 11/2021 | Channon et al. | |
| 2005/0274871 A1 | 12/2005 | Li et al. | |
| 2008/0055719 A1 * | 3/2008 | Perkins | G02B 5/3058 359/485.05 |
| 2008/0136956 A1 | 6/2008 | Morris et al. | |
| 2008/0311530 A1 | 12/2008 | Allen et al. | |
| 2009/0111056 A1 | 4/2009 | Hendel et al. | |
| 2009/0116790 A1 | 5/2009 | Mossberg et al. | |
| 2009/0117491 A1 | 5/2009 | Hendel et al. | |
| 2009/0134483 A1 | 5/2009 | Weng et al. | |
| 2010/0020400 A1 | 1/2010 | Amako | |
| 2011/0080572 A1 | 4/2011 | Kelkar | |
| 2012/0140197 A1 | 6/2012 | Bakker | |
| 2012/0219755 A1 | 8/2012 | Bae et al. | |
| 2013/0028589 A1 | 1/2013 | Zung et al. | |
| 2013/0074774 A1 | 3/2013 | Liu | |
| 2013/0250421 A1 * | 9/2013 | Wakabayashi | G02B 5/3025 359/576 |
| 2014/0001590 A1 | 1/2014 | Liu et al. | |
| 2015/0029588 A1 | 1/2015 | Fiorentino et al. | |
| 2015/0185617 A1 | 7/2015 | Markle et al. | |
| 2015/0378069 A1 | 12/2015 | Yamamoto et al. | |
| 2018/0143359 A1 | 5/2018 | Channon et al. | |
| 2019/0120999 A1 | 4/2019 | Iazikov et al. | |
| 2020/0133014 A1 | 4/2020 | Downing | |
| 2022/0011479 A1 | 1/2022 | Farys et al. | |
| 2022/0317466 A1 | 10/2022 | Downing | |

\* cited by examiner

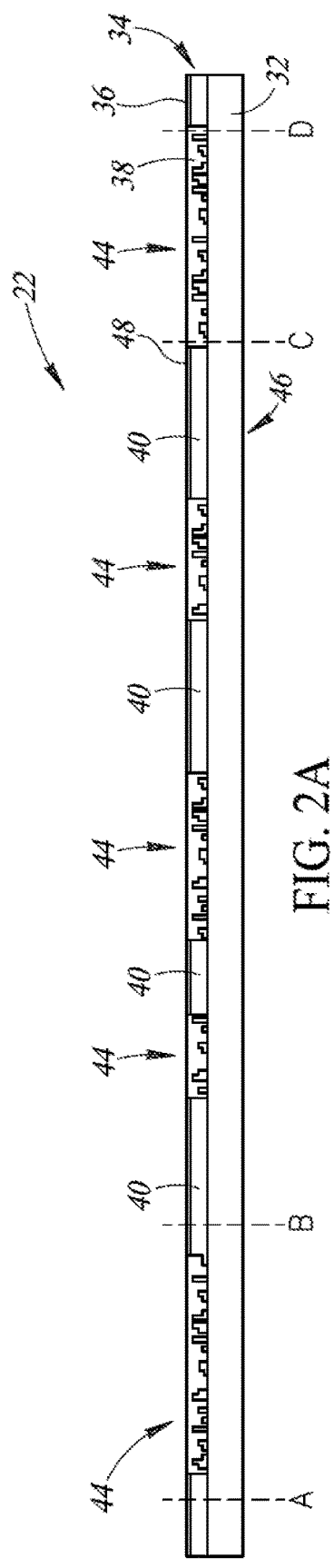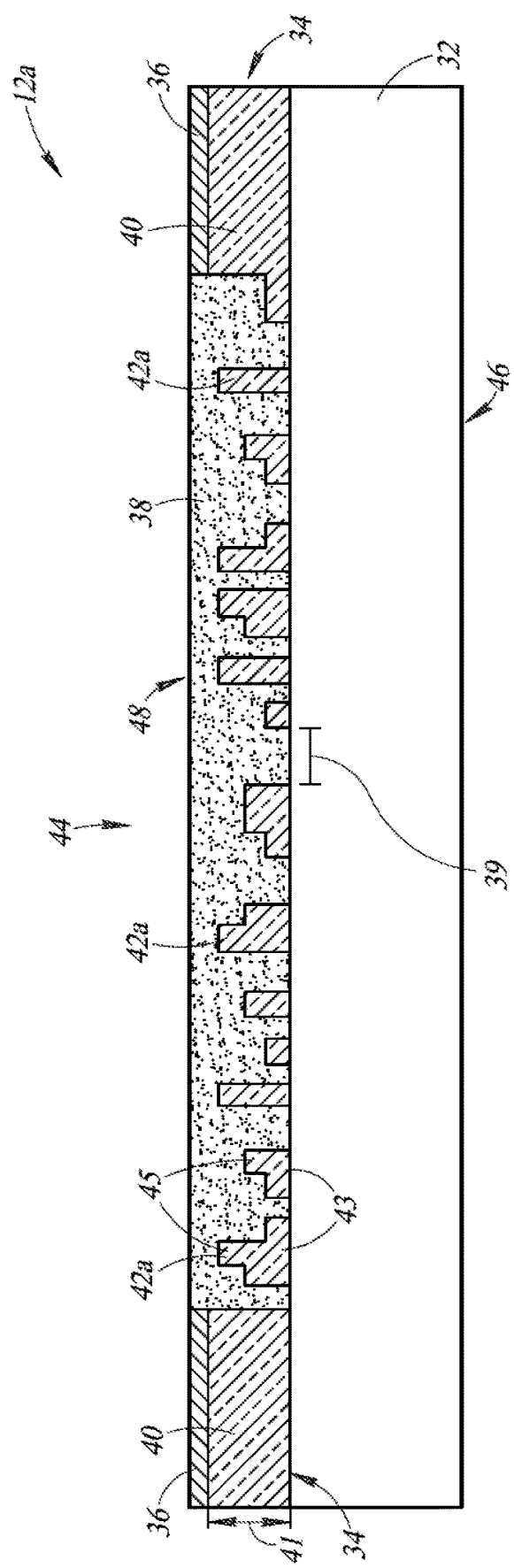

WAFER LEVEL MICROSTRUCTURES FOR AN OPTICAL LENS

BACKGROUND

Technical Field

The present disclosure is directed to wafer level microstructures for an optical lens.

Description of the Related Art

Diffractive optical lenses, sometimes referred to as diffractive optical elements, are commonly used to modulate light by diffraction. For example, a diffractive optical lens may be used to alter and split light that is propagated through the lens. A diffractive optical lens is typically made of a single material, such as glass, and includes a plurality of diffractive microstructures patterned directly in to a surface of the material.

A function of the diffractive microstructures of the diffractive optical lens is dependent on a refractive index of a material used to form the microstructures and a refractive index of an environment in which the microstructure exists, such as air. The dimensions, such as the height and width, of the diffractive microstructures may be customized according to the application. A size (i.e., aspect ratio) of the diffractive microstructures is dependent on a difference between the refractive index change of the material of the microstructures and the refractive index of the environment, i.e. where the microstructures are immersed.

As current diffractive optical lenses are typically made of single material and the refractive index of air remains relatively constant, adjusting the refractive index change of current diffractive optical lenses is typically limited to altering the material used for the lens Moreover, the diffractive microstructures of current diffractive optical lenses are often left exposed and unprotected. Consequently, the diffractive microstructures are vulnerable to damage or contamination from external sources. Any damage to or contamination of the diffractive microstructures may have unwanted effects on the light that is propagated through the diffractive optical lens. Further, attempting to clean the diffractive microstructures may unintentionally damage the diffractive microstructures because of their small and delicate structure.

In addition, current diffractive optical lenses do not provide a planar external surface because of the various heights and widths of the diffractive microstructures. Consequently, current diffractive optical lenses are not readily compatible with wafer-to-wafer bonding techniques or direct application of coatings, such as anti-reflective coatings.

BRIEF SUMMARY

The present disclosure is directed to an optical lens, or optical element, that includes wafer level microstructures.

According to one embodiment, the optical lens includes a substrate, a microstructure layer, and a protective layer.

The microstructure layer is formed on the substrate. In one embodiment, the substrate is made of a first material having a first refractive index and the microstructure layer is made of a second material having a second refractive index. The first refractive index may be the same or different from the second refractive index. The microstructure layer includes a plurality of diffractive microstructures. The protective layer is formed on the diffractive microstructures.

The microstructure layer and the protective layer form a diffractive layer that modulates light by diffraction. In one embodiment, the protective layer is made of a third material having a third refractive index that is larger than the second refractive index. The protective layer encapsulates the diffractive microstructures to prevent damage and contamination to the diffractive microstructures. Further, the protective layer provides a robust surface that may be easily cleaned without risk of damaging the diffractive microstructures. In addition, the protective layer provides a planar surface such that a coating, such as an anti-reflective coating, may be easily applied.

According to another embodiment, the optical lens includes a substrate and an anti-reflective microstructure layer.

The anti-reflective microstructure layer is formed on the substrate and includes a plurality of diffractive microstructures that modulate light by diffraction. The heights, or thickness, of each of the diffractive microstructures are selected to minimize reflection of light from the optical lens. In particular, the heights of the diffractive microstructures are selected such that light reflected from the interface between the substrate and the anti-reflective microstructure layer destructively interferes with light reflected from the interface between the anti-reflective microstructure layer and the material (e.g., a protective layer) or air immersing the anti-reflective microstructure layer.

The optical lens disclosed herein may be made of materials that are readily available and suitable for mass production. Moreover, the method of making the optical lens disclosed herein is capable of fabricating wafer level diffractive microstructures with high precision and accuracy.

BRIEF DESCRIPTION OF THE SEVERAL VIEWS OF THE DRAWINGS

FIG. 2A is a cross-sectional view of a wafer that includes one or more optical lenses according to one embodiment disclosed herein.

FIG. 2B is an enlarged cross-sectional view of a single optical lens from the wafer of FIG. 2A.

DETAILED DESCRIPTION

Figure 1:
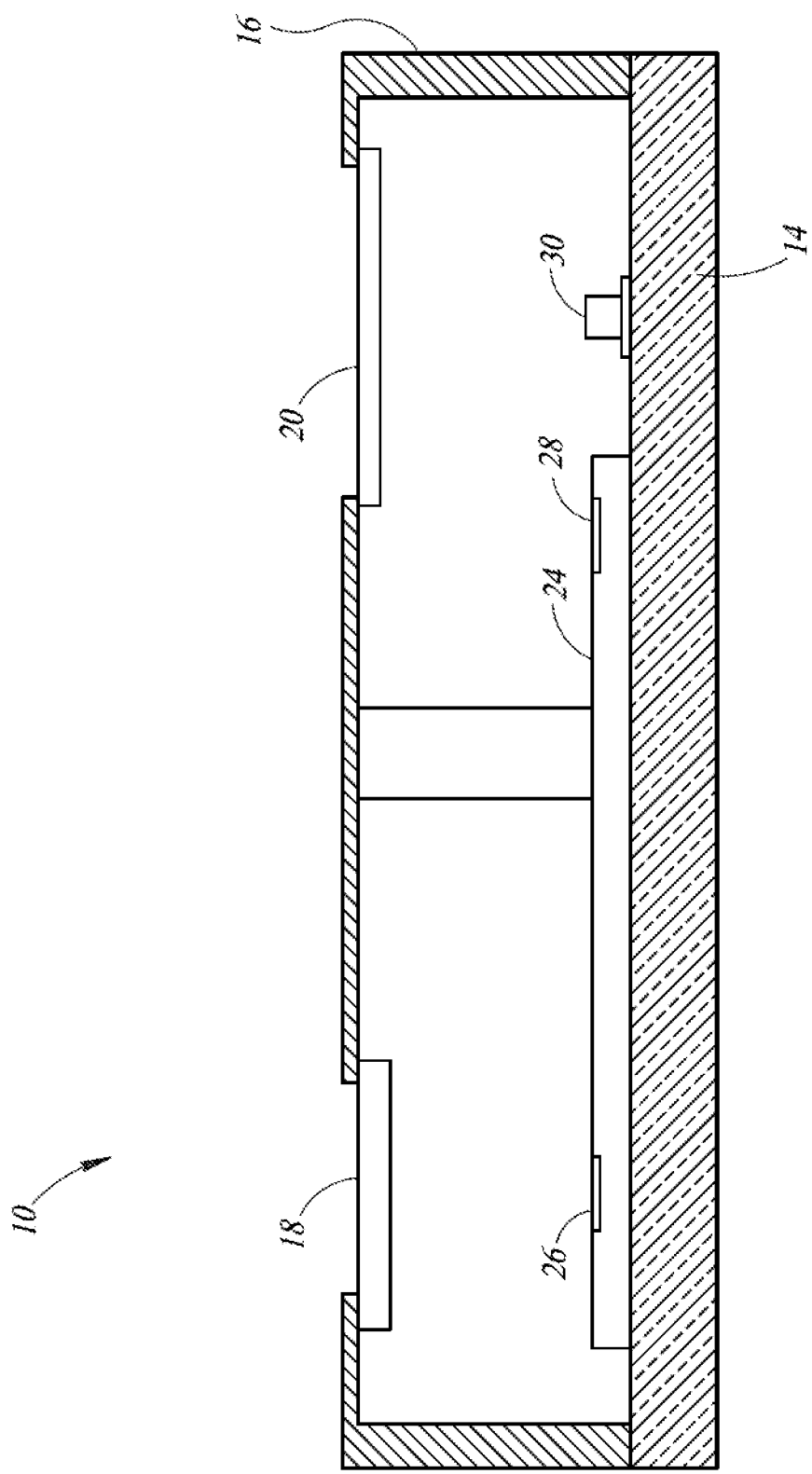
FIG. 1 is a cross-sectional view of a time of flight sensor that includes diffractive optical lenses according to one embodiment disclosed herein.

In the following description, certain specific details are set forth in order to provide a thorough understanding of various embodiments of the disclosure. However, one skilled in the art will understand that the disclosure may be practiced without these specific details. In some instances, well-known details associated with semiconductors, integrated circuits, and optical lenses have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Diffractive optical lenses may be used for a variety of different devices, including optical telecommunication devices, cameras, and optical sensors. The lenses may be used for beam splitting. Diffractive optical lenses can also be included in time-of-flight sensors. In general, a time-of-flight sensor determines a distance between the sensor and a target object by measuring the time a light signal takes to travel to the target object and back to the sensor. FIG. 1 is a cross-sectional view of a time-of-flight sensor 10 that includes diffractive optical lenses according to one embodiment. The time-of-flight sensor 10 includes a substrate 14, a cap 16, a receiving function optical lens 18, a transmitting function optical lens 20, a die 24 having a sensor array 26 and a reference array 28, and a vertical-cavity surface-emitting laser (VCSEL) 30. As will be discussed in further detail below, the receiving function optical lens 18 and the transmitting function optical lens 20 may each have one or more optically active regions. The time-of-flight sensor 10 is just one possible application for the diffractive optical lenses as described herein.

Figure 2C:
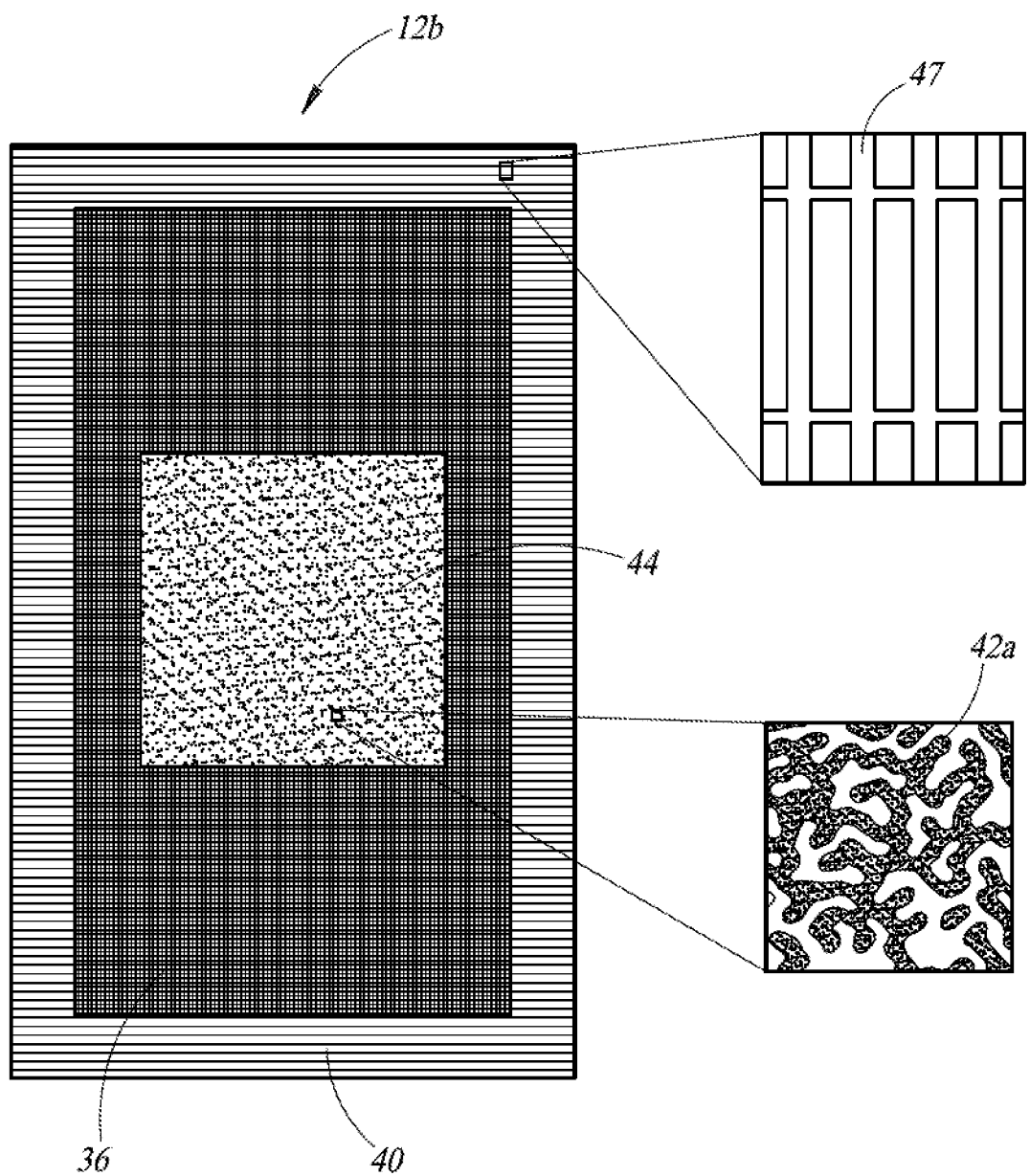
FIG. 2C is a plan view of a single optical lens according to one embodiment disclosed herein.

FIG. 2A is a cross-sectional view of a wafer 22 that includes one or more optical lenses according to one embodiment. FIG. 2B is an enlarged cross-sectional view of an optical lens 12a from the wafer 22. FIG. 2C is a plan view of an optical lens 12b according to one embodiment. It is beneficial to review FIGS. 2A, 2B, and 2C together. Optical lens 12a may be selected or diced from any portion of the wafer 22 to form a particular shape. For example, the optical lens 12a originates from the wafer between axis A and axis B. A different optical lens may also be formed between axis C and axis D of the wafer 22. The entire wafer 22 may even be used as an optical lens. The wafer 22 includes a substrate 32, a microstructure layer 34, a barrier layer 36, and a protective layer 38. The microstructure layer 34 is formed on the substrate 32. In one embodiment, the substrate 32 is a borosilicate glass wafer. In the same or another embodiment, the microstructure layer 34 is silicon, such as amorphous silicon, poly-crystalline silicon, and mono-crystalline silicon. The microstructure layer 34 includes a plurality of optically inactive regions 40 and a plurality of optically active regions 44.

The optically inactive regions 40 are regions of the wafer 22 that do not have a specific diffractive function, such as one selected by the manufacturer. Namely, although the optically inactive regions 40 may diffract some light, the optically inactive regions 40 are not fabricated to diffract light propagating through the optically inactive regions 40 for a specific purpose and are not intended to diffract light to a sensor, such as the sensor array 26. As best shown in FIG. 2C, the optically inactive regions 40 may include other types of structures 47 for various other purposes. The active microstructure region 42a may have an amorphous, organic, or otherwise non-linear pattern when viewed from a top down perspective. This non-linear pattern is in contrast to the linear pattern of the optically inactive regions 40. As noted above, the optically inactive regions are optically inactive with respect to light diffracted for the diffractive function.

In one embodiment, the barrier layer 36 is formed on each of the optically inactive regions 40. The barrier layer 36 is used as an opaque field to prevent light passing through the optically inactive regions 40. In one embodiment, as shown in FIG. 2C, the barrier layer 36 covers only a portion of the optically inactive region 40. In one embodiment, the barrier layer 36 is a metal layer. In another embodiment, the barrier layer 36 includes multiple layers that may include one or more metal layers. The microstructure layer 34 may have any number of optically inactive regions 40 and each of the optically inactive regions 40 may be any size.

The plurality of optically active regions 44 are regions of the wafer 22 that have a diffractive function, such as one selected by the manufacturer. Each of the optically active regions 44 includes a plurality of diffractive microstructures 42a and the protective layer 38. The diffractive microstructures 42a are formed in the microstructure layer 34. The optically active regions 44 may have various dimensions. As illustrated, the microstructures are wider closer to the substrate and narrower closer to a surface 48 of the protective layer. Alternatively, the optically active region 44 may have a widest dimension being adjacent to surface 48 and the narrowest dimensions being adjacent to the surface of the substrate 32. This is inverted with respect to the illustrated microstructures.

The diffractive microstructures 42a and the protective layer 38, together, form a diffractive layer that is configured to modulate light that propagates through the optically active regions 44 by diffraction. The diffractive microstructures 42a may have various heights and widths and may be customized for a specific purpose. For example, the diffractive microstructures 42a and the protective layer 38 may be adapted to alter the phase and magnitude of light propagating through the optically active regions 44. In one embodiment, the determination of the dimensions of the diffractive microstructures 42a is based on the material used for the microstructure layer 34 and the protective layer 38.

Figure 4:
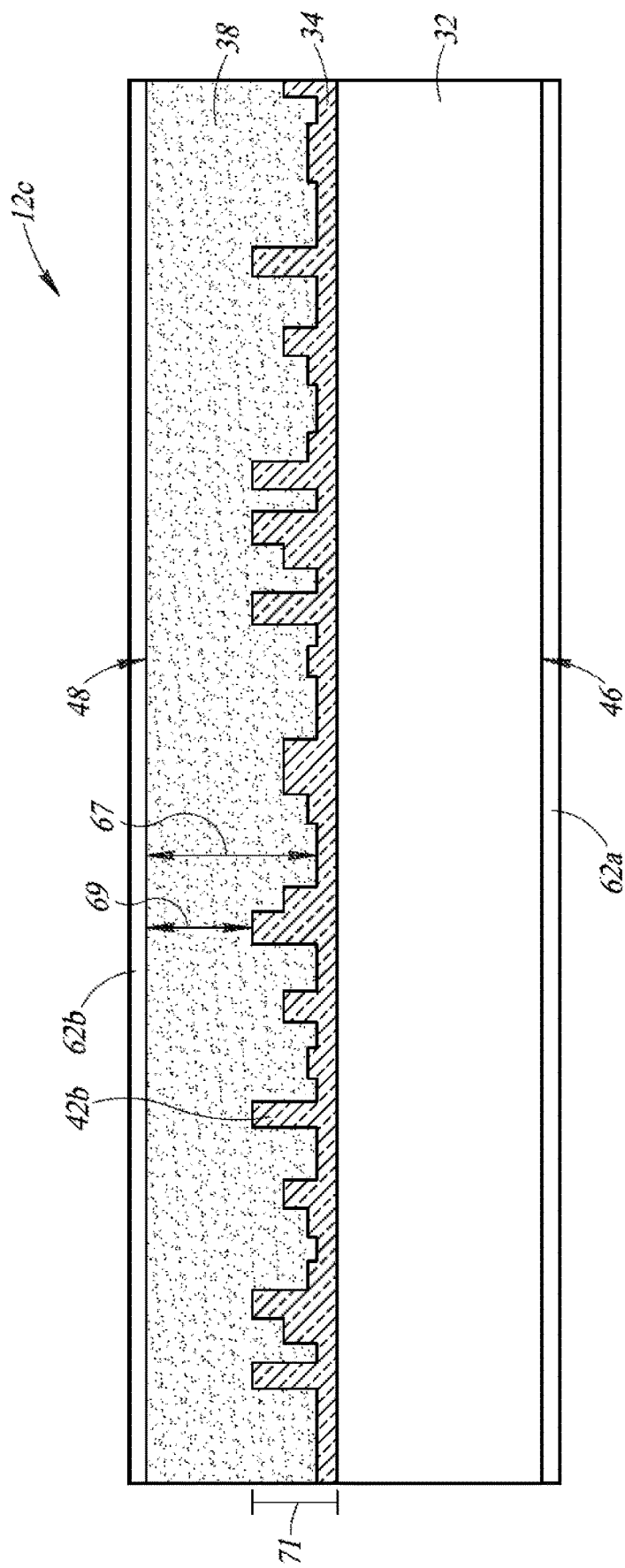
FIG. 4 is a cross-sectional view of an optical lens according to another embodiment disclosed herein.

In one embodiment, the diffractive microstructures 42a are spaced from each other on the substrate. For example, as shown in FIG. 2B, the diffractive microstructures 42a are separated from each other by the protective layer 38 such that there is a space or gap 39 that exposes the substrate to the protective layer. In another embodiment, some or all of the diffractive microstructures 42a are coupled to each other. Namely, a thin portion of the microstructure layer 34 lines the surface of the substrate 32 in the optically active regions 44. For example, FIG. 4 is a cross-sectional view of an optical lens 12c according to another embodiment. The optical lens 12c includes diffractive microstructures 42b that are at least partially coupled to each other by a portion of the microstructure layer 34 that is on the substrate 32. This coupling may simply be a portion of the microstructures not removed during manufacturing. In another embodiment some microstructures may be joined while others are spaced from each other.

In one embodiment, the microstructure layer 34 is formed from one thick solid layer, with a dimension 41 that extends from the substrate 32 to the barrier layer 36. If the barrier layer 36 is not present then the dimension 41 extends from the substrate 32 to the protective layer's surface 48. The diffractive microstructures 42a are formed using etching techniques used in semiconductor processing, like damascene processing. Existing semiconductor fabrication tools can be utilized to form the diffractive microstructures 42a. Each of the diffractive microstructures 42a has a base 43, and some of the diffractive microstructures 42a have a tower portion 45. In this embodiment, the base 43 is at least as wide as the tower portion 45 and often the base 43 is wider than the tower portion 45. Some tower portions have more than one height such that they have a stair-step cross-section. The relationship between the base and the tower is selected to give diffractive properties specific to the intended application of the optical lens.

Multiple semiconductor processing techniques can be utilized to form these microstructures. For example, one thick layer can be formed and then etched to form the different microstructures using a plurality of different masks. Alternatively, the microstructures are formed from a plurality of layers that are formed and etched consecutively, as shown in FIGS. 3A to 3K. The diffractive microstructures 42a are formed by forming a plurality of diffractive material layers in sequence using standard semiconductor manufacturing tools. After each layer is formed, portions of the layer are removed. In this method, the base 43 is at least as wide as or wider than the tower 45. In alternative methods, the tower 45 is at least as wide as or wider than the base 43, such that some towers are inverted such that a smaller part is closer to the substrate than a larger part.

The protective layer 38 is formed on the diffractive microstructures 42a in the optically active regions 44 either in one deposition step or in multiple steps that are rotated with steps of forming layers of the diffractive material. Ultimately, the protective layer 38 encapsulates the diffractive microstructures 42a to prevent damage and contamination to the diffractive microstructures 42a. Further, the protective layer 38 provides a robust surface that may be easily cleaned without risk of damaging the diffractive microstructures 42a. The protective layer 38 may be made of a variety of materials, such as silicon dioxide, silicon nitride, aluminum oxide, or epoxy. In one embodiment, the protective layer 38 is formed from a single layer. In an alternative embodiment, as will be described with respect to FIGS. 3A to 3K, the protective layer 38 is formed by multiple layers, where each layer may be a different material, such that a first layer is silicon nitride and a second and third layer is aluminum oxide.

As previously discussed, the diffractive function of a lens made of a single material is generally dependent on the refractive index change between the material of the lens and the medium immersing the lens, such as air. In contrast, the optical lens of this disclosure is made of multiple materials and the function of the optical lens may be set by selecting materials with different reflective indexes for the microstructure layer 34 and the protective layer 38. Namely, the microstructure layer 34 may be made of a first material having a first refractive index, and the protective layer 38 may be made of a second material having a second refractive index that is different from the first refractive index. As a result, it is possible to fabricate an optical lens having a high refractive index change, and thus good optical function, with materials that are readily available. In one embodiment, the refractive index of the microstructure layer 34 is higher than the refractive index of the protective layer 38. In the same or another embodiment, the substrate 32 is made of a third material having a third refractive index that is the same or different from the refractive index of the microstructure layer 34 or the refractive index of the protective layer 38. As noted above, each of the diffractive microstructures and the protective layer may include multiple layers of different types of materials.

Another advantage of the protective layer 38 is that, a first surface 46 and an opposite second surface 48 of the optical lens 12a can be planar and parallel to each other, see FIG. 4. The planar surfaces of the optical lens 12a allow wafer-to-wafer bonding. Namely, a wafer may be attached to the first surface 46 or the second surface 48. In addition, as will be discussed in further detail with respect to FIG. 4, the first surface 46 and the second surface 48 being planar allows for coatings 62a, 62b, such as an optical filter or anti-reflective coating, to be applied directly on the optical lens 12a.

One example includes, the substrate 32 being a borosilicate glass wafer having a reflective index of 1.46 for an incident wavelength of 940 nm, the microstructure layer 34 is poly-crystalline silicon having a reflective index of 3.5 for an incident wavelength of 940 nm, and the protective layer 38 is silicon dioxide having a refractive index of 1.45 for an incident wavelength of 940 nm. In this embodiment, the refractive index change of interest is approximately 2.04. Light propagating through the diffractive microstructures 42a has as a transmission efficiency of approximately 70% and light propagating around the diffractive microstructures 42a has a transmission efficiency of approximately 98%. Thus, the optical lens 12a, in which the diffractive microstructures 42a are separated from each other, will have an average efficiency of approximately 84%, and the optical lens 12c, in which a thin portion of the microstructure layer 34 lines the surface of the substrate 32 in the optically active regions 44, will have a transmission efficiency of 70%.

The substrate 32 may have a thickness between 200 to 220 µm, and the microstructure layer 34 may have a thickness between 10 to 1000 nm. In one or more embodiments, the substrate 32 has a thickness that is greater than a thickness of the microstructure layer 34.

As noted above, FIGS. 3A to 3K are cross-sectional views illustrating subsequent stages of manufacturing for fabricating an optical lens, such as the optical lens 12a. Although the optically inactive regions 40 and the barrier layer 36 are not shown in FIGS. 3A to 3K, one of ordinary skill in the art would recognize that the optically inactive regions 40 and the barrier layer 36 may be formed simultaneously with the fabrication of the optical lens shown in FIGS. 3A to 3K.

Figure 3A:
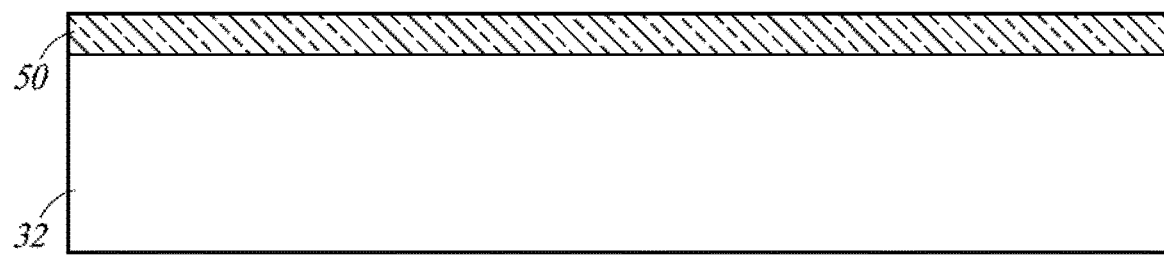
FIGS. 3A to 3K are cross-sectional views illustrating subsequent stages of manufacturing for fabricating an optical lens according to one embodiment disclosed herein.

In FIG. 3A, a first layer 50 of the diffractive material is formed on the substrate 32. The diffractive material may be silicon or a combination of silicon and other elements selected for their refractive index property. The first layer 50 may be formed using semiconductor processing techniques such as sputtering, chemical vapor deposition, or plasma vapor deposition, which allows a manufacturer to use existing semiconductor processing machines for forming this optical lens with selected diffractive properties. In one embodiment, as previously discussed, the substrate 32 is glass and the microstructure layer 34 is silicon.

Figure 3B:
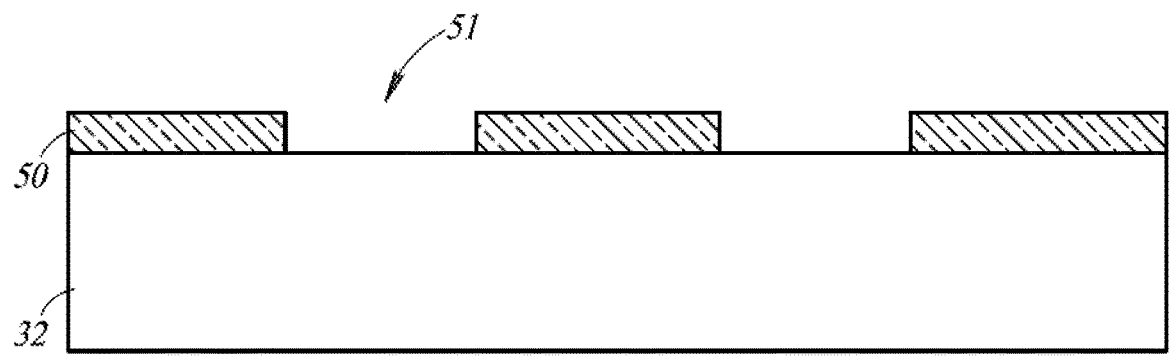

In FIG. 3B, the first layer 50 of the microstructure layer 34 is patterned and etched to remove portions of the first layer 50 to expose the substrate 32 and form openings 51. The openings may be formed using masking techniques or other standard semiconductor processing techniques for masking and removing materials. For example, portions of the first layer 50 may be removed by chemical etching.

In an alternative embodiment, the first layer 50 of the microstructure layer 34 as shown in FIG. 3B is formed by using a pattern deposition. This may be achieved with a photoresist deposition process. Positive or negative photolithography may be used for masking techniques. In yet another variation, a first layer 52 of the protective layer may be formed first and patterned to be in the openings 51 prior to forming the first layer 50 of the diffractive material layer.

Figure 3C:
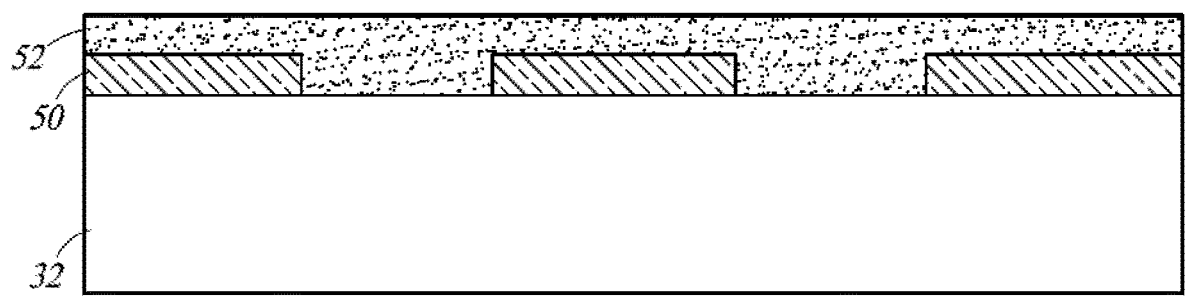

In FIG. 3C, the first layer 52 of the protective layer 38 is formed on the first layer 50 of the microstructure layer 34 and in the openings 51 on the exposed surface of the substrate 32. The first layer 52 of the protective layer 38 may be formed using standard semiconductor processing techniques. In one embodiment, as previously discussed, the first layer 52 is silicon dioxide, which has a different refractive index than the microstructure layer 34.

Figure 3D:
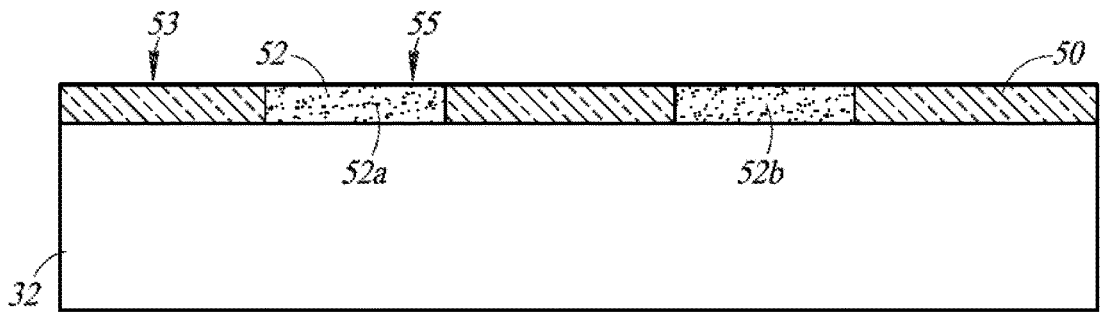

In FIG. 3D, the first layer 52 of the protective layer 38 is planarized such that an upper surface 53 of the first layer 50 of the microstructure layer 34 and an upper surface 55 of the first layer 52 of the protective layer 38 are coplanar. The first layer 52 of the protective layer 38 may be planarized using standard semiconductor processing techniques such as chemical mechanical planarization.

Figure 3E:
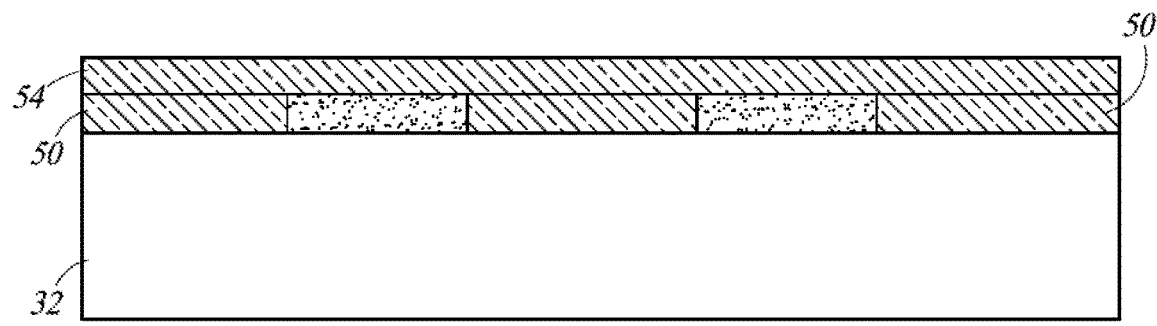

In FIG. 3E, a second layer 54 of the diffractive material is formed on the planar surface of the first layer 50 of the microstructure layer 34 and the first layer 52 of the protective layer 38.

Figure 3F:
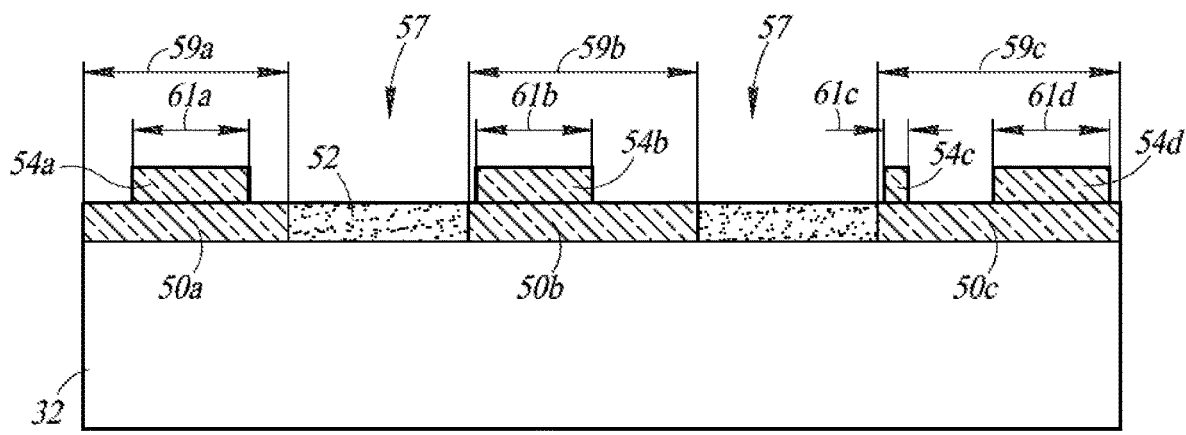

In FIG. 3F, the second layer 54 of the diffractive material is patterned and etched to remove portions of the second layer 54 and reexpose the first layer 50 of the microstructure layer 34 and the first layer 52 of the protective layer 38. This forms openings 57 that have different sizes and shapes as compared to the openings 51 and as compared to each other. The second layer 54 may be patterned using the techniques described with respect to FIG. 3B, which may include masking layers and photoresist that are not shown.

Sections 50a, 50b, and 50c of the first layer 50 of the microstructure layer 34 have selected widths 59a, 59b, 59c and substantially the same height. The widths and the heights of the sections may be selected based on the diffractive properties identified for a particular use. For example, sections 54a, 54b, 54c, and 54d each have widths 61a, 61b, 61c, and 61d that are selected to form the selected diffractive properties. In the embodiment shown in FIG. 3F, none of the widths 61a, 61b, 61c, and 61d are wider than the widths 59a, 59b, 59c, as the sections 50a, 50b, and 50c can be thought of as a base for a tower that is formed to support each diffractive element. Each section 54a, 54b, 54c, and 54d is on top of and within the dimensions of the sections 50a, 50b, and 50c. In another embodiment, one or more of the widths 61a, 61b, 61c, and 61d are wider than the widths 59a, 59b, 59c.

Figure 3G:
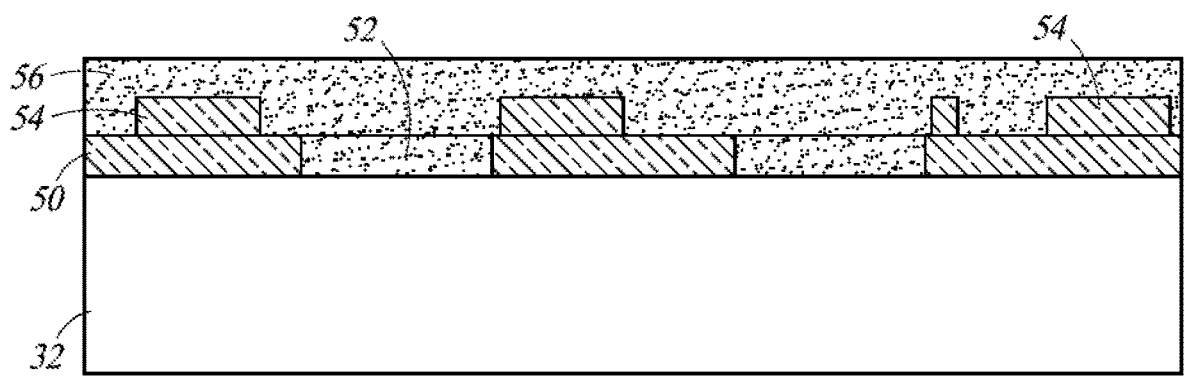

In FIG. 3G, a second layer 56 of the protective layer 38 is formed on the first layer 52 of the protective layer 38, the exposed surface of the first layer 50 of the microstructure layer 34, and the second layer 54 of the microstructure layer 34.

Figure 3H:
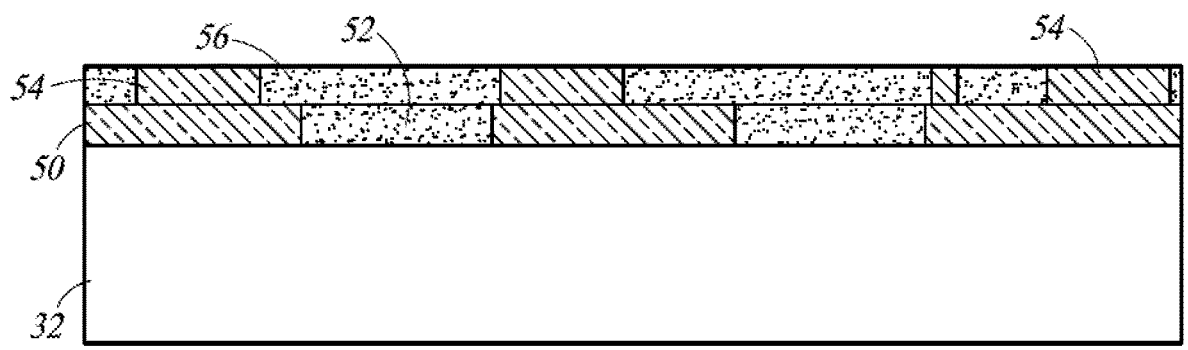

In FIG. 3H, the second layer 56 of the protective layer 38 is planarized such that the upper surfaces of the second layer 54 of the microstructure layer 34 and the second layer 56 of the protective layer 38 are coplanar.

Figure 3I:
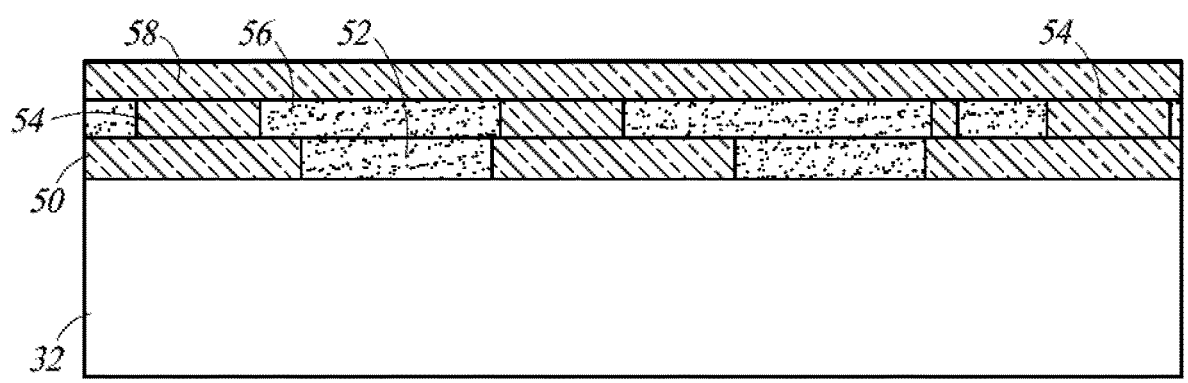

In FIG. 3I, a third layer 58 of the diffractive material is formed on the second layer 54 of the microstructure layer 34 and the second layer 56 of the protective layer 38.

Figure 3J:
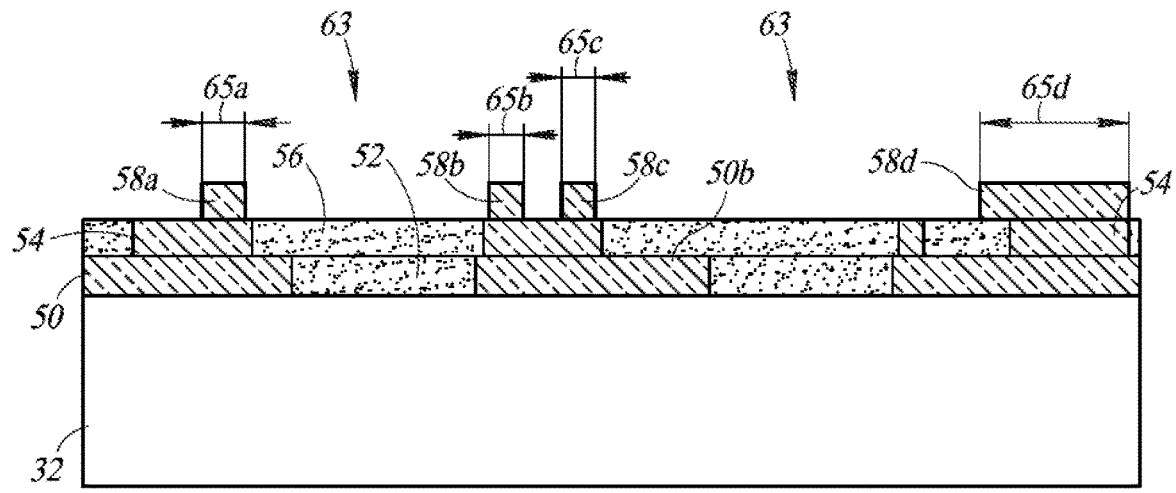

In FIG. 3J, the third layer 58 of the microstructure layer 34 is patterned with a mask (not shown) to remove portions of the third layer 58 and reexpose portions of the second layer 54 of the microstructure layer 34 and the second layer 56 of the protective layer 38. This forms openings 63.

The remaining portions of the third layer 58 form sections 58a, 58b, 58c, and 58d. As previously discussed, the widths and heights may be selected based on the diffractive properties identified for a particular use. For example, each section has a width 65a, 65b, 65c, 65d that is selected to form the selected diffractive properties. In the embodiment shown in FIG. 3J, each of the widths 65a, 65b, and 65c is less than the widths 61a and 61b, and the width 65d is greater than the width 61d. As with sections 58b and 58c, some towers will have multiple "peaks" on a single base or section, for example, section 50b.

Figure 3K:
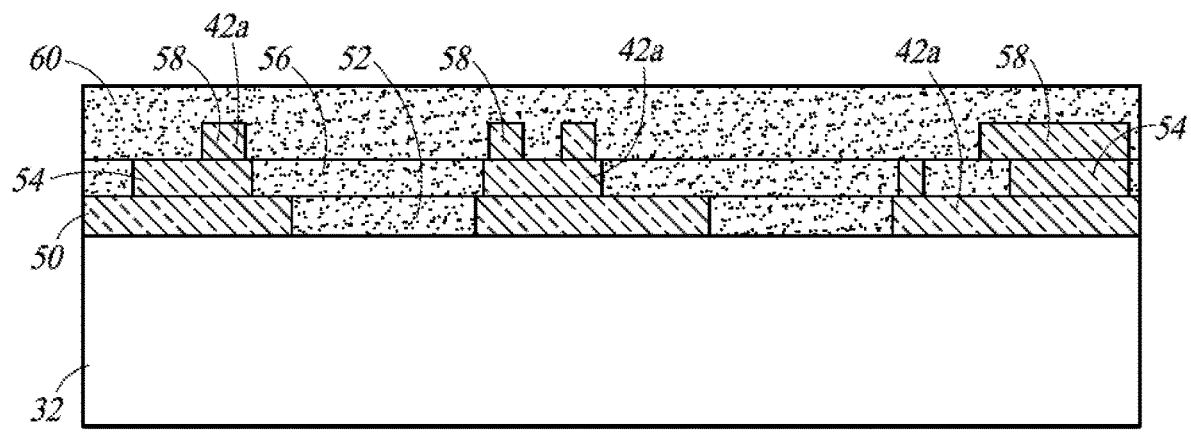

In FIG. 3K, a third layer 60 of the protective layer 38 is formed on the second layer 56 of the protective layer 38, the exposed surface of the second layer 54 of the microstructure layer 34, and on the third layer 58 of the microstructure layer 34. The third layer 60 of the protective layer 38 may be formed using the techniques described with respect to FIG. 3C. The third layer 60, in conjunction with the previously formed layers of protective material is used to encapsulate the diffractive microstructures 42a. In one embodiment, the third layer 60 is subsequently planarized to provide a planar surface.

It should be noted that although the diffractive microstructures 42a shown in FIG. 3K includes three layers 50, 54, and 58. The diffractive microstructures 42a may be made of any number of layers. In one embodiment, the diffractive microstructures 42a includes at least two layers. In addition, each of the layers 50, 54, and 58 may have various heights.

As described with respect to FIGS. 3A to 3K, the diffractive microstructures 42a and the protective layer 38 may be formed by forming multiple layers of the diffractive microstructures 42a and the protective layer 38 in an alternating sequence. In another embodiment, the diffractive microstructures 42a are completely formed first and the protective layer 38 is subsequently formed over the diffractive microstructures 42a. In this embodiment, as previously, discussed, the diffractive microstructures 42a and the protective layer 38 may each be formed by a single layer or by multiple layers.

In one embodiment, the microstructure layer 34 is made of multiple different materials. As one example, the first layer 50 of the microstructure layer 34 may be made of amorphous silicon and the second layer 54 of the microstructure layer 34 may be made of poly-crystalline silicon. As another example, section 50a of the first layer 50 may be made of amorphous silicon and section 50b of the first layer 50 may be made of poly-crystalline silicon. In the same or another embodiment, the protective layer 38 is made of multiple different materials. As one example, the first layer 52 of the protective layer 38 may be made of silicon dioxide and the second layer 56 of the protective layer 38 may be made of aluminum oxide. As another example, section 52a of the first layer 52 may be made of silicon dioxide and section 52b of the first layer 52 may be made of aluminum oxide. The use of different materials for the microstructure layer 34 and the protective layer 38 will be discussed in further detail with respect to FIGS. 18 to 21.

By using the fabrication techniques described with respect to FIGS. 3A to 3K, diffractive microstructures, such as the diffractive microstructures 42a of the optical lens 12a, may be made at a wafer level and with high precision. Accordingly, an optical lens, such as the optical lens 12a, may be fabricated to modulate light for specific purposes with high accuracy.

FIG. 4 is a cross-sectional view of an optical lens 12c according to another embodiment. The optical lens 12c includes diffractive microstructures 42b and coatings 62a, 62b.

As previously discussed, in contrast to the diffractive microstructures 42a of the optical lens 12a, the diffractive microstructures 42b are at least partially coupled to each other. In other words, the surface of the substrate 32 is covered by at least a thin portion of the microstructure layer 34. Accordingly, any light propagating through the optical lens 12c will pass through at least a portion of the microstructure layer 34.

The lens 12c includes the substrate 32 on which the microstructure layer 34 is formed. One side of the microstructure layer 34 is flush with a top surface of the substrate 32. Another side of the microstructure layer 34 includes a plurality of different peaks or towers that extend away from the top surface of the substrate 32. These different peaks have different heights, widths, and thicknesses. The protective layer 38 is formed on the microstructure layer 34. A total height 67 of the protective layer 38 includes a height 69 from a top of the microstructure layer 34 to a top surface of the protective layer 38. The height 69 of the protective layer 38 is greater than a total height 71. Other variations of these heights are envisioned.

The top surface of the protective layer 38 is planar. This both protects the microstructures and provides a surface for the coating 62b. A bottom or second surface of the substrate is also planar and can receive coating 62a.

The coating is not easily formed on diffractive microstructures because of the various heights and widths of the diffractive microstructures. A coating formed directly on the diffractive microstructures will have irregular or discontinuous areas that will alter the refractive index the diffractive microstructures. The surfaces 46 and 48 provide planar surfaces such that the coating 62a, 62b is easily applied. The coating 62a, 62b may be any type of coating. For example, the coating 62a, 62b may be an optical filter, such as a bandpass filter and an interference filter, or an anti-reflective coating. The anti-reflective coating may be any type of material having an anti-reflection property that may be centered on a desired transmission wavelength. The coating 62a, 62b may be formed on the first surface 46, the second surface 48, or both the first and second surfaces 46 and 48 of the optical lens 12c. In one embodiment, the coatings 62a, 62b on the first surface 46 and the second surface 48 are two different types of coatings. For example, a coating on the first surface 46 may be an interference filter and a coating on the second surface 48 may be an antireflective coating.

In other embodiments, the coating 62b is embedded within the optical lens, rather than on the first and second surfaces 46 and 48. Namely, the coating 62b may be formed between the substrate and the diffractive microstructures, between individual layers of the diffractive microstructures, and directly on the diffractive microstructures.

Figure 5:
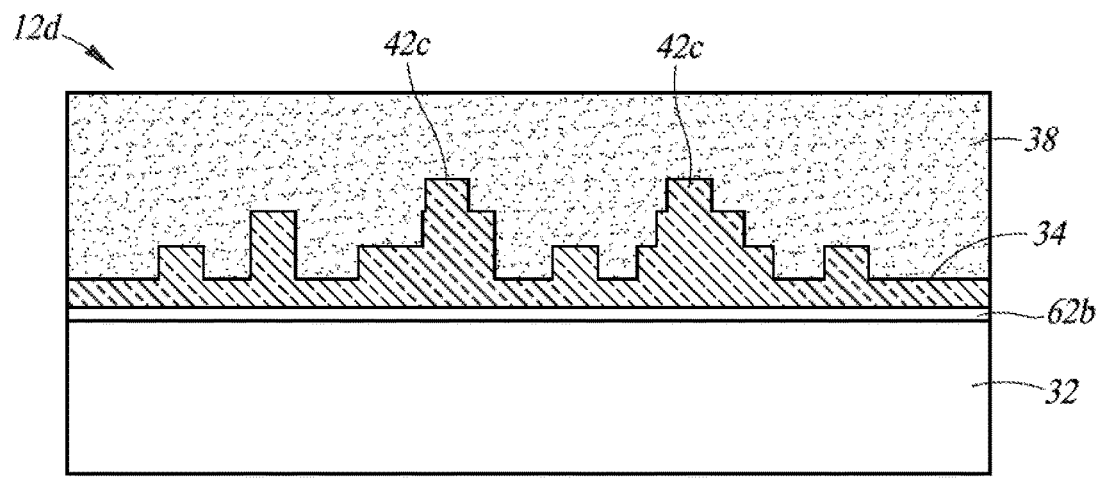
FIG. 5 is a cross-sectional view of an optical lens according to another embodiment disclosed herein.

FIG. 5 is a cross-sectional view of an optical lens 12d according to another embodiment. The optical lens 12d includes diffractive microstructures 42c and the coating 62b. Similar to the diffractive microstructures 42b, the diffractive microstructures 42c are coupled to each other between the bases. In this embodiment, the coating 62b is formed directly on the substrate 32, and the diffractive microstructures 42c are formed on the coating 62b.

Figure 6:
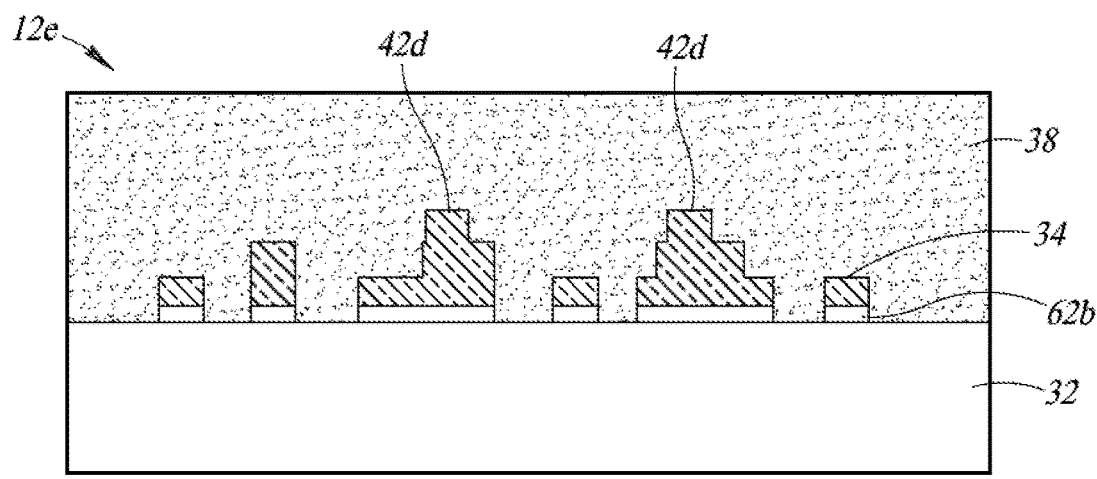
FIG. 6 is a cross-sectional view of an optical lens according to another embodiment disclosed herein.

FIG. 6 is a cross-sectional view of an optical lens 12e according to another embodiment. The optical lens 12e includes diffractive microstructures 42d and the coating 62b. Similar to the diffractive microstructures 42a, the diffractive microstructures 42d are spaced from each other in that portions of the substrate are exposed between ones of the microstructures. In this embodiment, the coating 62b is formed between the substrate 32 and each of the diffractive microstructures 42d. Each base is a same dimension as the coating 62b on the substrate. The towers of each microstructure vary in height and width.

Figure 7:
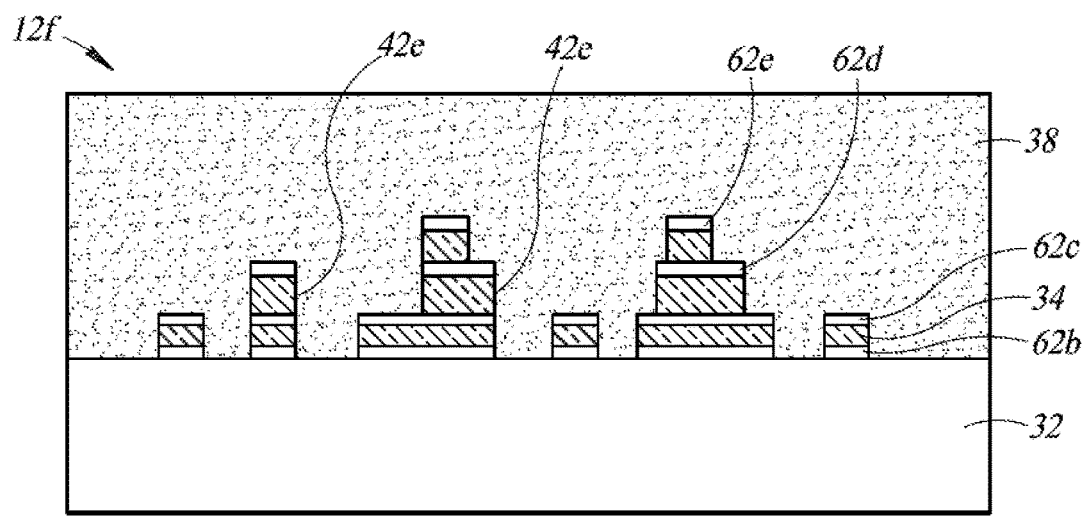
FIG. 7 is a cross-sectional view of an optical lens according to another embodiment disclosed herein.

FIG. 7 is a cross-sectional view of an optical lens 12f according to another embodiment. Similar to the diffractive microstructures 42a, the diffractive microstructures 42e are spaced from each other. In this embodiment, the coating is multiple coatings 62c, 62d, 62e, which are formed on the diffractive microstructures 42e and between each layer of the diffractive microstructures 42e. Accordingly, each of the diffractive microstructures 42 includes a plurality of layers of the coating 62.

The present disclosure is directed to an optical lens that includes a substrate and a plurality of microstructures on the substrate. The plurality of microstructures may be formed in a variety of ways. For example, ones of the plurality of microstructures may include a first layer of material on the substrate, a second layer of material on the first layer of material, where the first layer of material has a different width than the first layer of material. Adjacent ones of the plurality of microstructures may be spaced from each other by a distance so that a portion of the substrate is exposed between the adjacent ones of the plurality of microstructures. These microstructures may exist without a protective layer.

Another example includes a plurality of microstructures that have an anti-reflective coating positioned between the microstructure and the substrate. Another example includes an anti-reflective coating between each layer of material of each microstructure. Another example includes a microstructure on the substrate having a wider portion spaced from the substrate by a narrower portion. Each of the layers of the microstructure may be different materials.

Figure 8:
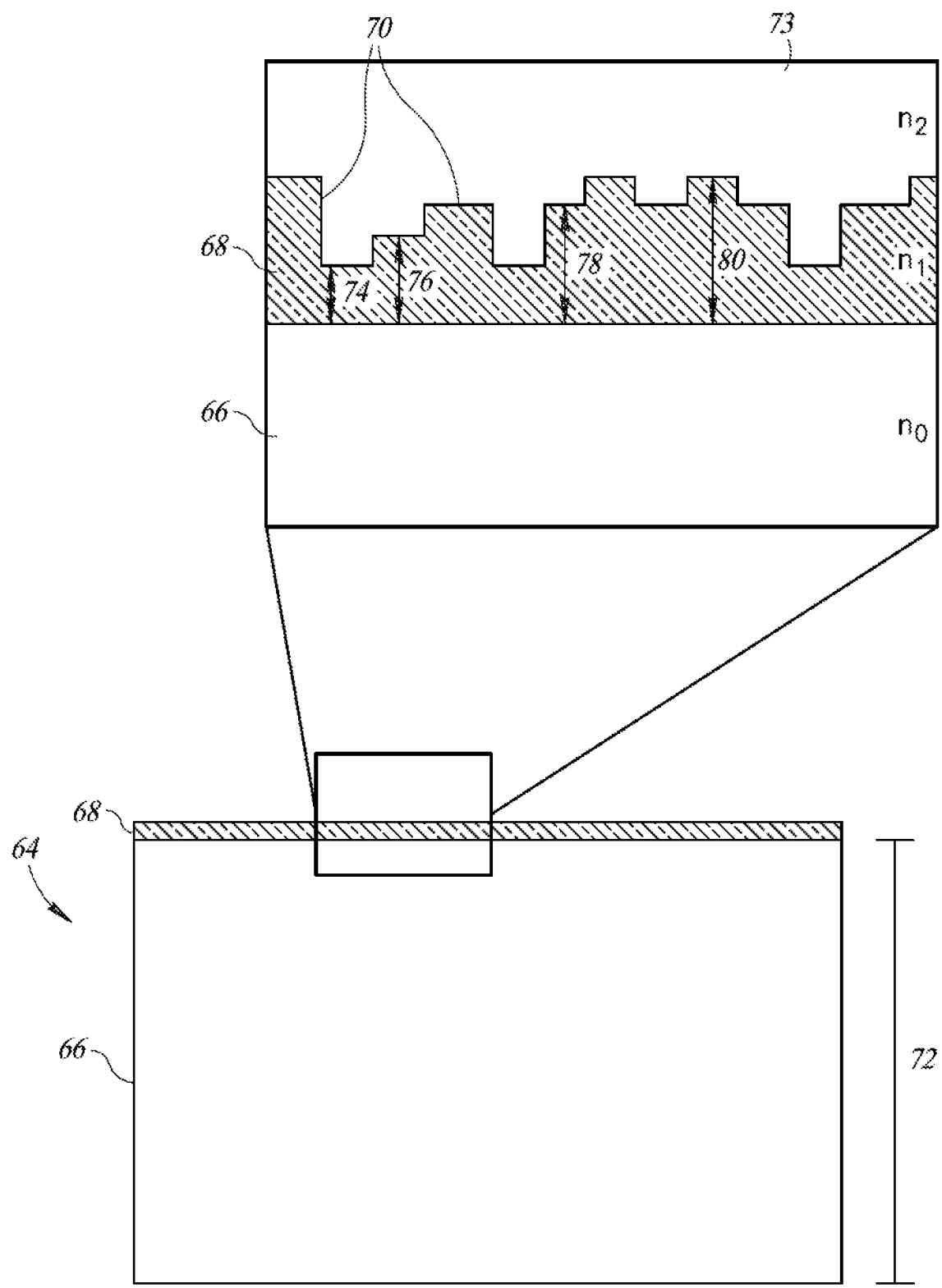
FIG. 8 is a cross-sectional view of an optical lens according to another embodiment disclosed herein.

The present disclosure is also directed to an optical lens that includes diffractive microstructures that also function as an anti-reflective coating. For example, FIG. 8 is a cross-sectional view of an optical lens 64 according to another embodiment. Similar to the optical lens 12a, the optical lens 64 includes a substrate 66 and an anti-reflective microstructure layer 68 on the substrate 66.

As shown in the enlarged portion of the optical lens 64, the anti-reflective microstructure layer 68 includes a plurality of diffractive microstructures 70. These microstructures are sized and shaped to minimize Fresnel losses at an interface between to materials that have different refractive indices. Generally, light is incident on an interface between two materials that have different refractive indices such that some light will be reflected and some light will pass through. The amount reflected depends on a ratio between the refractive indices. For example, for a glass window in air, the total loss is about 8% through two interfaces (air to glass, then glass to air).

Anti-reflective coatings are included to minimize the loss at an interface, where such loss can be reduced to less than one percent. Anti-reflective coatings are currently only applied to flat surfaces. The present disclosure creates diffractive microstructures to provide diffractive functions at the same time as providing the benefits of an anti-reflective coating.

Anti-reflective coatings provide destructive interference of reflections in thin films where a thickness of the film is less than or equal to a wavelength of the light. In the embodiments described herein, the diffractive microstructures 70 are sized and shaped to provide destructive interference for reflections while also modulating light that propagates through the diffractive microstructures by diffraction. The diffractive microstructures 70 have various heights and widths that may be adapted to alter the phase and magnitude of light propagating through the optical lens 64.

The anti-reflective microstructure layer 68 is both a diffractive layer and an anti-reflective layer. In particular, the anti-reflective microstructure layer 68 is fabricated to be very thin, of the order of a target wavelength of light to be transmitted through the optical lens 64. The sizes and shapes of the microstructures with respect to the substrate are selected to optimize performance. For example, as shown in FIG. 8, the substrate 66 has a height 72, and the anti-reflective microstructure layer 68 has heights 74, 76, 78, and 80. The height 72 of the substrate 66 may be between 100 to 500 μm, and the heights 74, 76, 78, and 80 of the anti-reflective microstructure layer 68 may be between 0 to 3000 nm. In addition, the heights of the diffractive microstructures 70 are selected such that light reflected from the interface between the substrate 66 and the anti-reflective microstructure layer 68 destructively interferes with light reflected from the interface between the anti-reflective microstructure layer 68 and the material or air immersing the anti-reflective microstructure layer 68. The determination of the heights of the diffractive microstructures 70 to provide such destructive interference will be discussed in further detail with respect to FIG. 9.

The substrate 66 is made of a material having a first refractive index $n_0$, and the anti-reflective microstructure layer 68 is made of a material having a second refractive index $n_1$. The anti-reflective microstructure layer 68 is immersed in a material or air having a third refractive index $n_2$. In one embodiment, the first refractive index $n_0$ is not equal to the second refractive index $n_1$. In the same or another embodiment, the second refractive index $n_1$ is not equal to the third refractive index $n_2$. In the same or another embodiment, the first refractive index $n_0$ is equal to the third refractive index $n_2$. As noted above, if the refractive indices are different there is potential for loss and thus selecting the materials and selecting sizes of the diffractive microstructures can minimize the loss by producing destructive interference of reflections. As the loss occurs at each interface, the present disclosure describes a variety of options for addressing the losses at these interfaces.

In one embodiment, the substrate 34 is made of borosilicate glass with the anti-reflective microstructure layer 68 being made of silicon, such as amorphous silicon, poly-crystalline silicon, and mono-crystalline silicon. In the same or another embodiment, the anti-reflective microstructure layer 68 is immersed in a protective layer 73, such as silicon dioxide, silicon nitride, aluminum oxide, or epoxy. The protective layer provides a planar surface and protects the microstructures from dust and other materials.

Although not shown in FIG. 8, in one embodiment, a dielectric layer, such as silicon dioxide, is formed between the substrate 66 and the anti-reflective microstructure layer 68 (i.e., the dielectric layer is formed on the substrate 66, and the anti-reflective microstructure layer 68 is formed on the dielectric layer).

Similar to the microstructure layer 34 and the protective layer 38, in one or more embodiments, the anti-reflective layer 68 and the protective layer 73 are each made of multiple different materials. For example, a first section of the anti-reflective microstructure layer 68 may be made of amorphous silicon and a second section of the anti-reflective microstructure layer 68 may be made of poly-crystalline silicon. The use of different materials for the anti-reflective microstructure layer 68 and the protective layer 73 will be discussed in further detail with respect to FIGS. 18 to 21.

Figure 9:
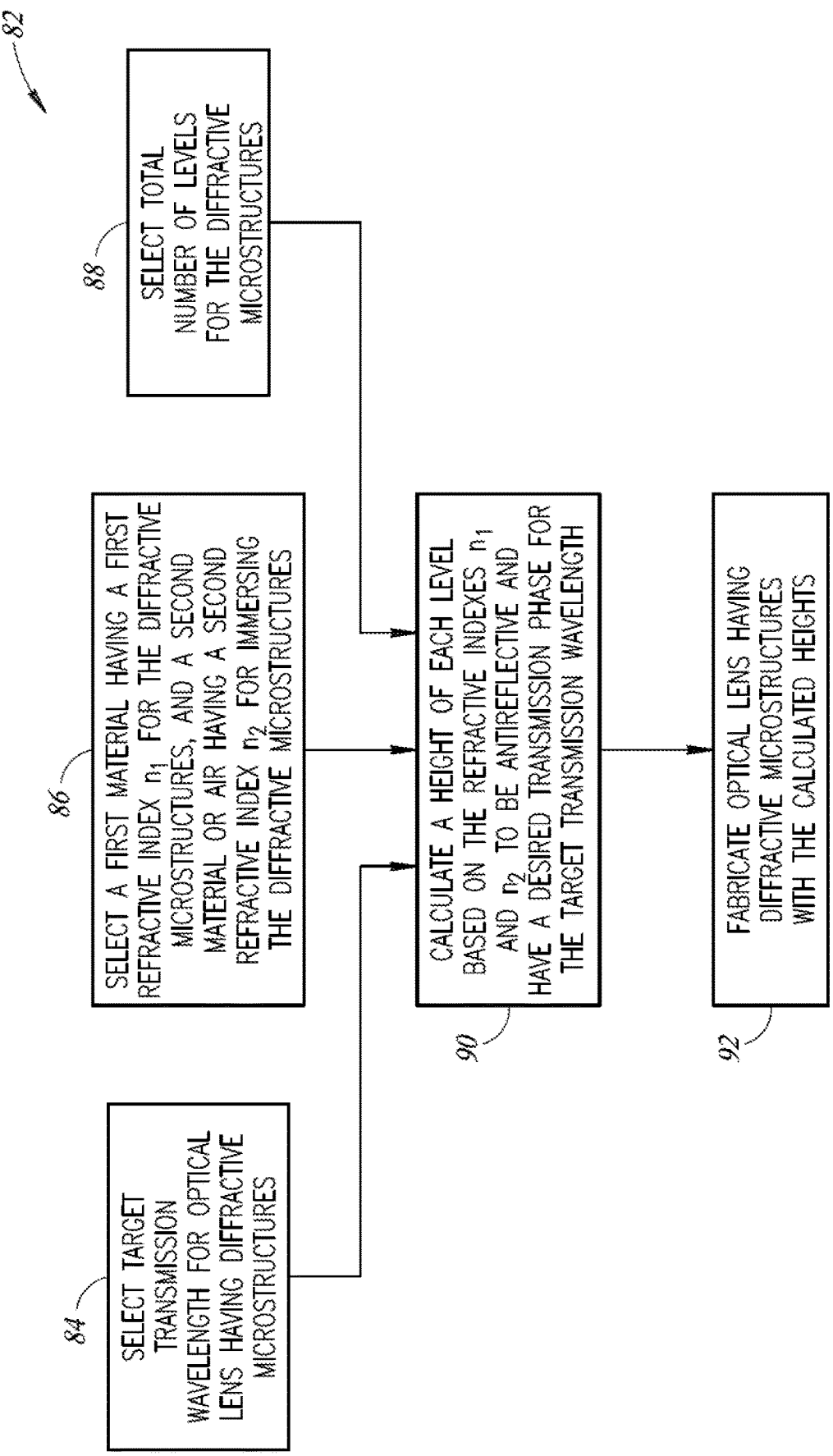
FIG. 9 is a flow diagram illustrating a process for calculating heights of diffractive microstructures to be anti-reflective according to one embodiment disclosed herein.

As previously discussed, the heights of the diffractive microstructures 70 are designed such that the anti-reflective microstructure layer 68 is anti-reflective and diffractive. FIG. 9 is a flow diagram illustrating a process 82 for calculating heights of the diffractive microstructures 70 to be anti-reflective and diffractive according to one embodiment. These heights are calculated based on a variety of parameters that may be known from the start or may be selected based on the end results identified for the optical lens.

Figure 12:
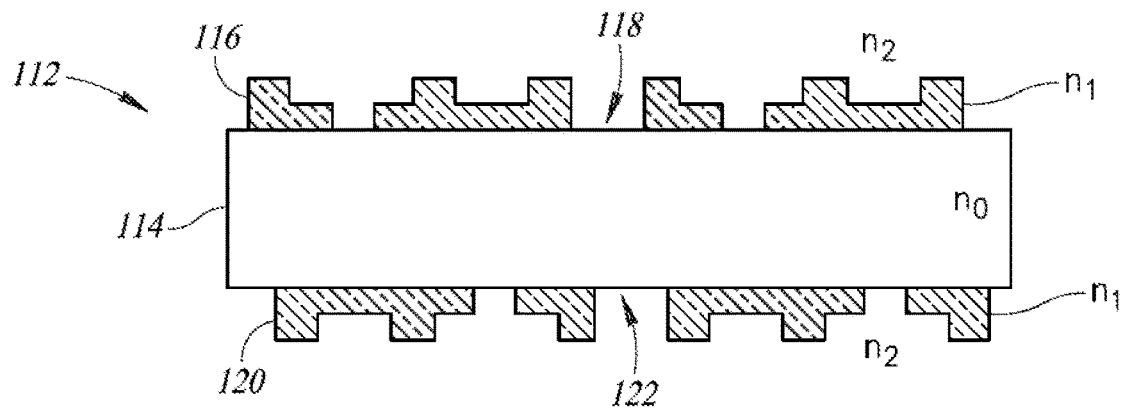
FIG. 12 is a cross-sectional view of an optical lens according to another embodiment disclosed herein.

The process is performed for one layer of diffractive microstructures and can be repeated for each layer of diffractive microstructures to be included in the final device, such as the optical device in FIG. 12, which includes diffractive microstructures on both sides of a substrate. The process can begin with anyone of these steps, 84, 86, and 88 and will depend on the competing demands of available materials and selected final device properties. The process evaluates the interfaces associated with the diffractive microstructures, which are associated with the materials that are in direct contact with each other.

Figure 10:
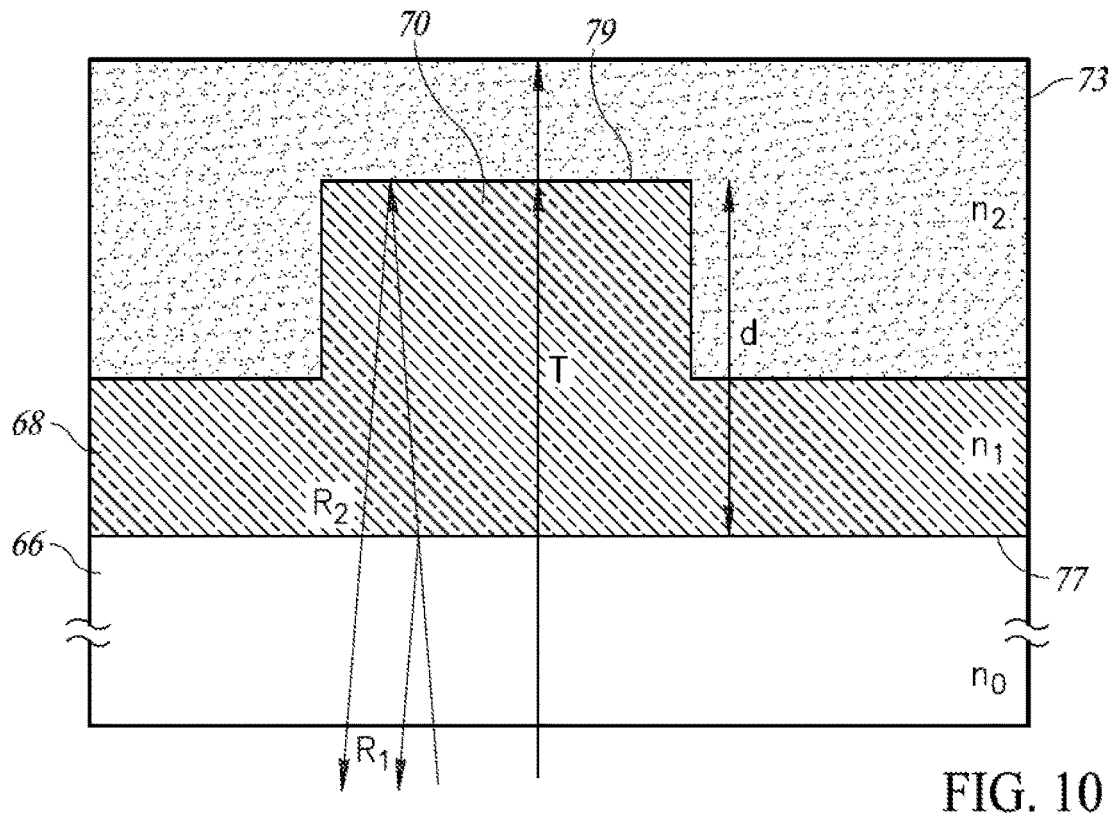
FIG. 10 is a cross-sectional view of a diffractive microstructure for which the height of the diffractive microstructure is being calculated according to one embodiment disclosed herein.

In step 84, a target transmission wavelength λ for an optical lens having diffractive microstructures is selected. The target transmission wavelength λ is a selected wavelength of light to be transmitted through the optical lens. For example, see T in FIG. 10. In FIG. 10, there are three materials with three different refractive indices through which the light will pass. As will be seen, properties of these materials and the loss characteristics are relevant in calculating the heights of the microstructures. Other combinations of materials include FIGS. 11-17 where there are many interfaces between the different materials included. Each of these combinations of materials will be discussed below.

Once the target transmission wavelength is selected or otherwise identified, materials for the layers and the number of layers have to be identified so that the process can performed for each relevant interface.

In step 86, the materials are selected or identified for the diffractive microstructures and the layer immersing the diffractive microstructures. For example, with respect to FIG. 10, a first material having a first refractive index $n_1$ is identified for the diffractive microstructures and a second material (that may be air) is identified and has a second refractive index $n_2$. The second material is configured to surround or otherwise immerse the diffractive microstructures, such as a protective layer. In one embodiment, the first and second materials are selected based on their refractive indexes. For example, in one embodiment, the materials are selected such that the refractive index $n_1$ is not equal to the refractive index $n_2$.

In step 88, a total number of different levels N for the diffractive microstructures 70 is selected. The total number of levels N is the maximum number of different heights, or thicknesses, that the diffractive microstructures may have. For example, as shown in FIG. 8, the diffractive microstructures 70 have a total number of levels N equal to 4 (heights 74, 76, 78, and 80). FIG. 10 includes a total number of levels N equal to 2.

Steps 84, 86, and 88 may be performed concurrently or sequentially. For example, in one embodiment, step 84 is performed first, step 86 is performed second, and step 88 is performed third.

In step 90, a height of each level N is calculated based on the refractive indexes $n_1$ and $n_2$ to be anti-reflective and have a desired transmission phase for the target transmission wavelength λ. Namely, the height is calculated to generate the destructive interference to minimize losses of light passing through the lens, and to transmit a phase delay to perform a desired diffractive function.

FIG. 10 is an enhanced cross-sectional view of a diffractive microstructure for which the height of the diffractive microstructure is being calculated according to one embodiment. T is light that is transmitted through the substrate 66 and the diffractive microstructure, R1 is light that is reflected from the interface 77 between the substrate 66 and the diffractive microstructure, R2 is light that is reflected from the interface between the diffractive microstructure and the material, which may be air immersing the diffractive microstructure, and d is the height of the level being calculated. The height d is from the interface 77 to a top surface 79 of the microstructure.

For the diffractive microstructure to be anti-reflective, the diffractive microstructure should have a height d such that $R_1$ destructively interferes with $R_2$. In order for $R_1$ and $R_2$ to destructively interfere with each other, the reflection phase of $R_2$ should satisfy equation 1, as follows:

$$\phi_{R_2} = p\pi \tag{1}$$

where p equals 0 or a multiple of 2 (i.e., 0, 2, 4, 6, 8, 10, ...).

The reflection phase of R2 of a diffractive microstructure for a $k^{th}$ level of the levels N (e.g., k=0, 1, 2, or 3 for N=4) is defined by equation 2, as follows:

$$\phi_{R_2} = \frac{4\pi n_1}{(n_1 - n_2)} * \left(\frac{k}{N} + m\right) \tag{2}$$

As previously discussed, $n_1$ is the refractive index of the anti-reflective microstructure layer 68 as selected in step 86, $n_2$ is the refractive index of the material or air immersing the anti-reflective microstructure layer 68 as selected in step 86, N is the total number of levels as selected in step 88, and k is the particular level of the total number of level N in which the reflection phase is being calculated for. The parameter m is the number of 2π phase rotations in transmission that is needed to satisfy equation 1. In other words, m is the number phase rotations in transmission needed for the reflection phase of R2 to be equal to, or at least approximately equal to, 0 or an integer multiple of 2π. For example, assuming $n_1$=1.6, $n_2$=1, N=4, and k=1, the reflection phase of R2 equals 24π and satisfies equation 1 when m=2.

Once m is determined, the transmission phase of T of the diffractive microstructure for the $k^{th}$ level may be determined using equation 3, as follows:

$$\phi_T = \frac{2\pi k}{N} + m * 2\pi \tag{3}$$

For example, assuming $n_1$=1.6, $n_2$=1, N=4, k=1, and m=2, the transmission phase of T equals 4.5π, or π/2+4π, where 4π is equivalent to 0 in phase.

The height d of the $k^{th}$ level that provide destructive interference between R1 and R2 may then be determined for the target transmission wavelength λ using equations 4 or 5, as follows:

$$d = \frac{\phi_T \lambda}{2\pi(n_1 - n_2)} \tag{4}$$

$$d = \frac{\phi_R \lambda}{4\pi n_1} \tag{5}$$

For example, assuming λ=550 nm, $n_1$=1.6, $n_2$=1, N=4, k=1, m=2, $\phi_T$=4.571, $\phi_R$=24π, the height d equals 2062.5 nm. The height d is calculated for each of the levels N. In step 92, the optical lens having diffractive microstructures with the calculated heights is fabricated.

In other embodiments, the optical lens 64 includes a coating, such as the coating 62; a protective layer, such as the protective layer 38; and/or another anti-reflective microstructure layer formed on an opposite side of the substrate 66 from the anti-reflective microstructure layer 68.

Figure 11:
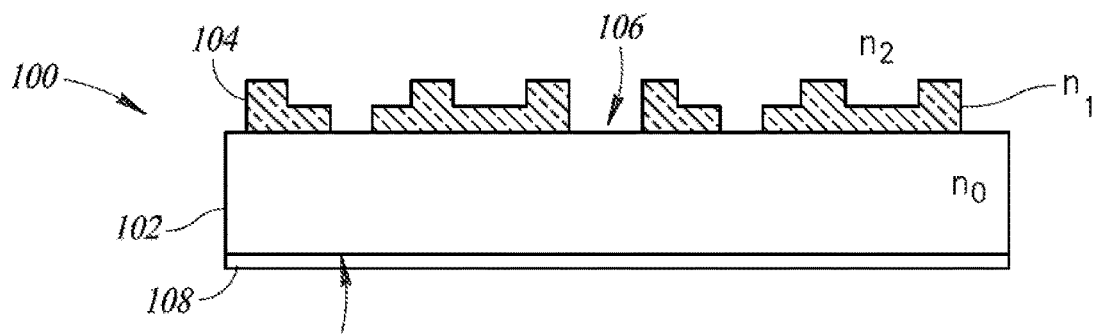
FIG. 11 is a cross-sectional view of an optical lens according to another embodiment disclosed herein.

FIG. 11 is a cross-sectional view of an optical lens 100 according to another embodiment. The optical lens 100 includes a substrate 102 having a first refractive index no, an anti-reflective microstructure layer 102 having a second refractive index $n_1$ on first surface 106 of the substrate 102, and a coating 108 on a second surface 110 that is opposite to the first surface 106. The anti-reflective microstructure layer 102 is immersed in air having a refractive index $n_2$. In one embodiment, refractive indexes $n_1 \neq n_2$ and $n_1 \neq n_0$.

FIG. 12 is a cross-sectional view of an optical lens 112 according to another embodiment. The optical lens 112 includes a substrate 114 having a first refractive index no, a first anti-reflective microstructure layer 116 having a second refractive index $n_1$ on first surface 118 of the substrate 114, and a second anti-reflective microstructure layer 120 having the second refractive $n_1$ on a second surface 122 that is opposite to the first surface 118. The anti-reflective microstructure layers 116 and 120 are immersed in air having a refractive index $n_2$. In one embodiment, refractive indexes $n_1 \neq n_2$, and $n_1 \neq n_0$.

Figure 13:
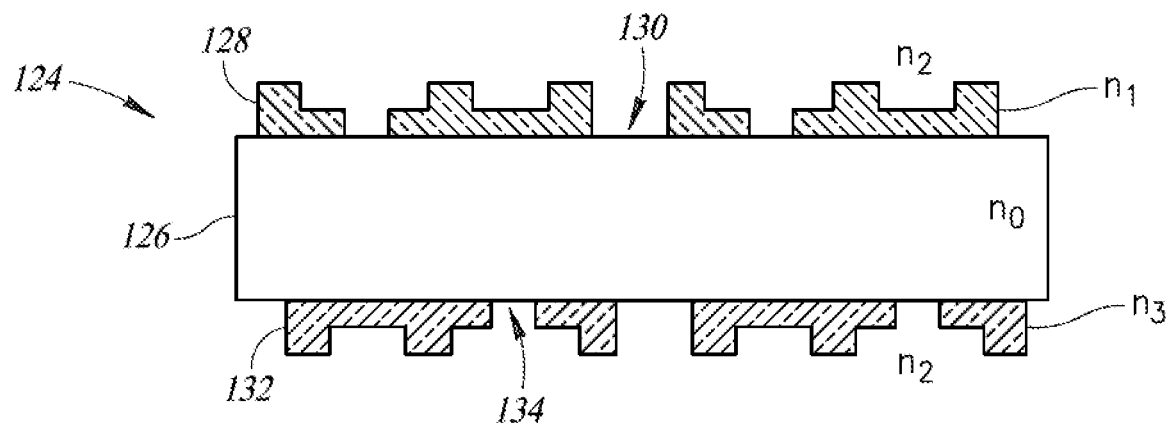
FIG. 13 is a cross-sectional view of an optical lens according to another embodiment disclosed herein.

FIG. 13 is a cross-sectional view of an optical lens 124 according to another embodiment. The optical lens 124 includes a substrate 126 having a first refractive index no, a first anti-reflective microstructure layer 128 having a second refractive index $n_1$ on first surface 130 of the substrate 126, and a second anti-reflective microstructure layer 132 having a third refractive $n_3$ on a second surface 134 that is opposite to the first surface 130. The anti-reflective microstructure layers 128 and 132 are immersed in air having a refractive index $n_2$. In one embodiment, refractive indexes $n_1 \neq n_2$, $n_1 \neq n_0$, $n_3 \neq n_0$, and $n_3 \neq n_2$.

Figure 14:
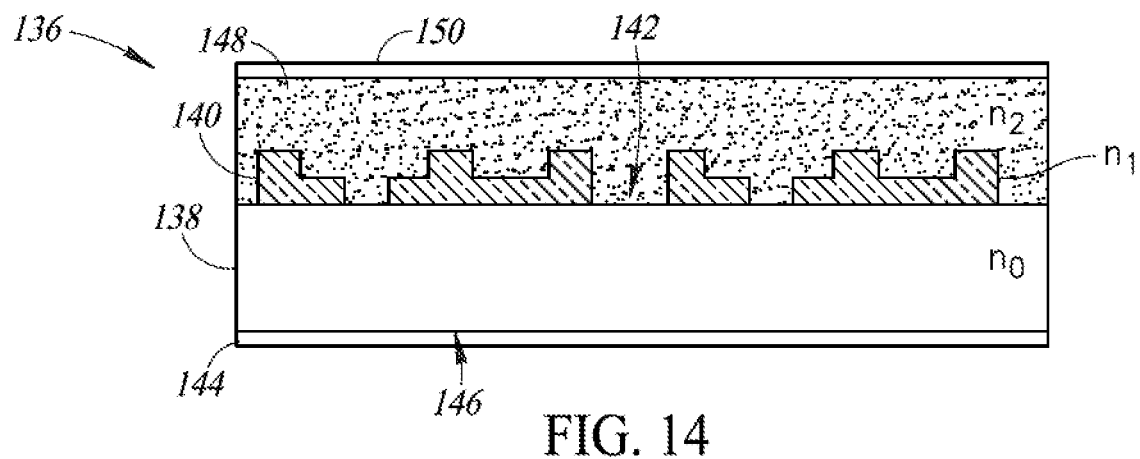
FIG. 14 is a cross-sectional view of an optical lens according to another embodiment disclosed herein.

FIG. 14 is a cross-sectional view of an optical lens 136 according to another embodiment. The optical lens 136 includes a substrate 138 having a first refractive index $n_0$, an anti-reflective microstructure layer 140 having a second refractive index $n_1$ on first surface 142 of the substrate 138, a first coating 144 on a second surface 146 that is opposite to the first surface 142, a protective layer 148 having a third refractive index $n_2$ over the anti-reflective microstructure layer 140, and a second coating 150 on the protective layer 148. In one embodiment, refractive indexes $n_1 \neq n_2$, and $n_1 \neq n_0$.

Figure 15:
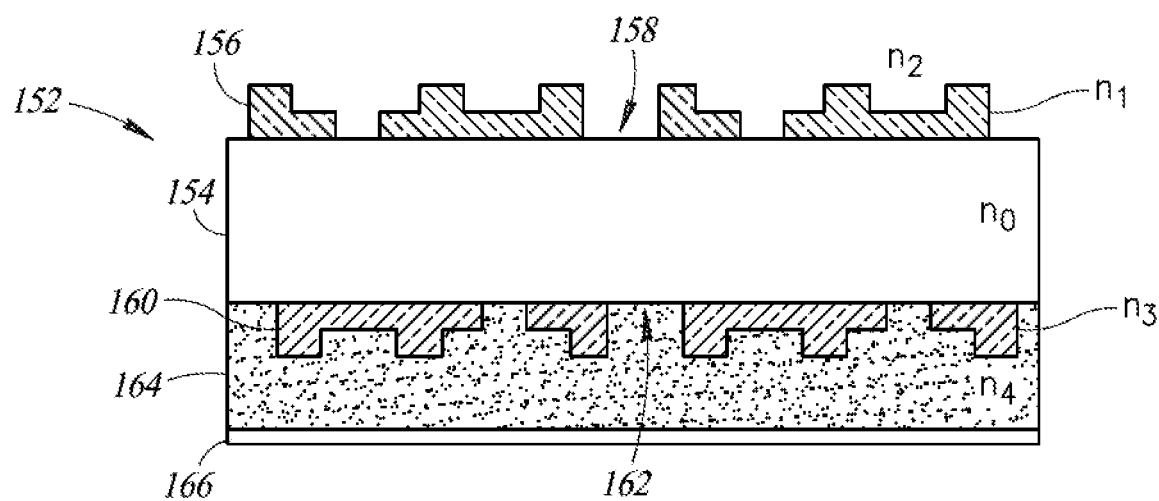
FIG. 15 is a cross-sectional view of an optical lens according to another embodiment disclosed herein.

FIG. 15 is a cross-sectional view of an optical lens 152 according to another embodiment. The optical lens 152 includes a substrate 154 having a first refractive index no, a first anti-reflective microstructure layer 156 having a second refractive index $n_1$ on first surface 158 of the substrate 154 and immersed in air having a third refractive index $n_2$, a second anti-reflective microstructure layer 160 having a fourth refractive $n_3$ on a second surface 162 that is opposite to the first surface 158, a protective layer 164 having a fifth refractive index $n_4$ over the second anti-reflective microstructure layer 160, and a coating 166 on the protective layer 164. In one embodiment, refractive indexes $n_1 \neq n_2$, $n_1 \neq n_0$, $n_3 \neq n_0$, $n_3 \neq n_2$, and $n_3 \neq n_4$.

Figure 16:
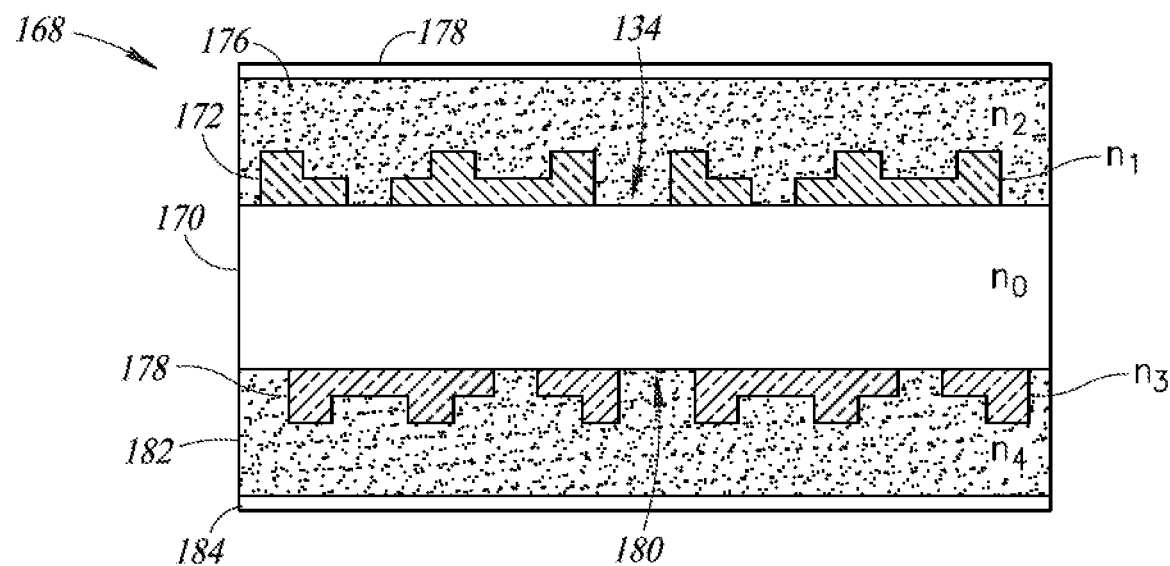
FIG. 16 is a cross-sectional view of an optical lens according to another embodiment disclosed herein.

FIG. 16 is a cross-sectional view of an optical lens 168 according to another embodiment. The optical lens 168 includes a substrate 170 having a first refractive index no, a first anti-reflective microstructure layer 172 having a second refractive index $n_1$ on first surface 174 of the substrate 170, a first protective layer 176 having a third refractive index $n_2$ over the first anti-reflective microstructure layer 172, a first coating 177 on the first protective layer 176, a second anti-reflective microstructure layer 178 having a fourth refractive $n_3$ on a second surface 180 that is opposite to the first surface 174, a second protective layer 182 having a fifth refractive index $n_4$ over the second anti-reflective microstructure layer 178, and a coating 184 on the second protective layer 182. In one embodiment, refractive indexes $n_1 \neq n_2$, $n_1 \neq n_0$, $n_3 \neq n_0$, $n_3 \neq n_2$, and $n_3 \neq n_4$.

Figure 17:
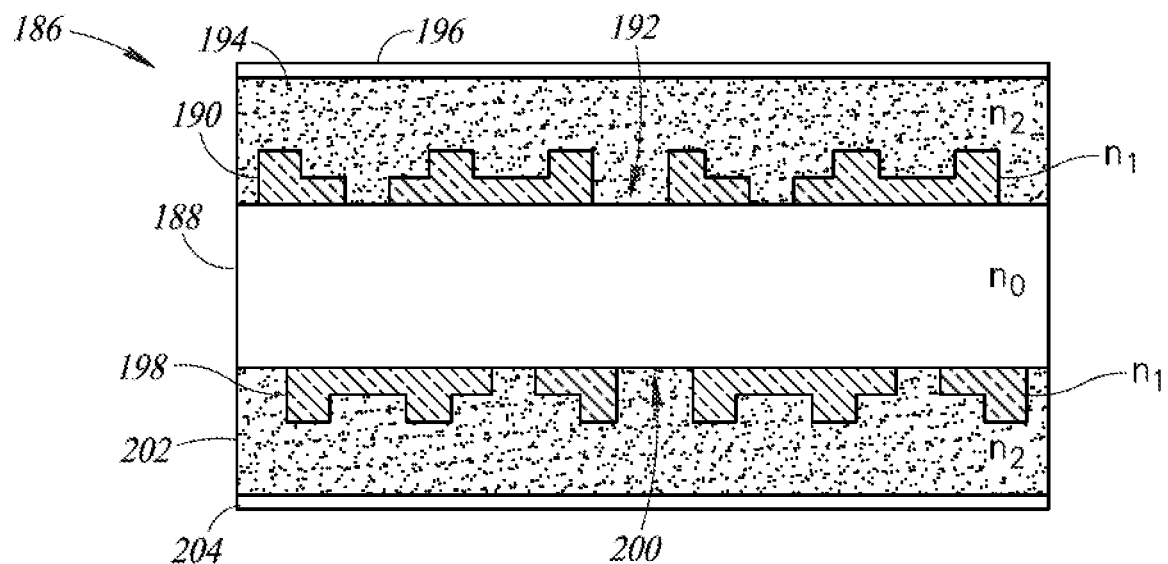
FIG. 17 is a cross-sectional view of an optical lens according to another embodiment disclosed herein.

FIG. 17 is a cross-sectional view of an optical lens 186 according to another embodiment. The optical lens 186 includes a substrate 188 having a first refractive index no, a first anti-reflective microstructure layer 190 having a second refractive index $n_1$ on first surface 192 of the substrate 188, a first protective layer 194 having a third refractive index $n_2$ over the first anti-reflective microstructure layer 190, a first coating 196 on the first protective layer 194, a second anti-reflective microstructure layer 198 having the second refractive $n_1$ on a second surface 200 that is opposite to the first surface 192, a second protective layer 202 having the third refractive index $n_2$ over the second anti-reflective microstructure layer 198, and a coating 204 on the second protective layer 202. In one embodiment, refractive indexes $n_1 \neq n_2$, and $n_1 \neq n_0$.

As previously discussed, the microstructure layer 34, the protective layer 38, the anti-reflective microstructure layer 68, and the protective layer 73 may each be made of multiple different materials.

Figure 18:
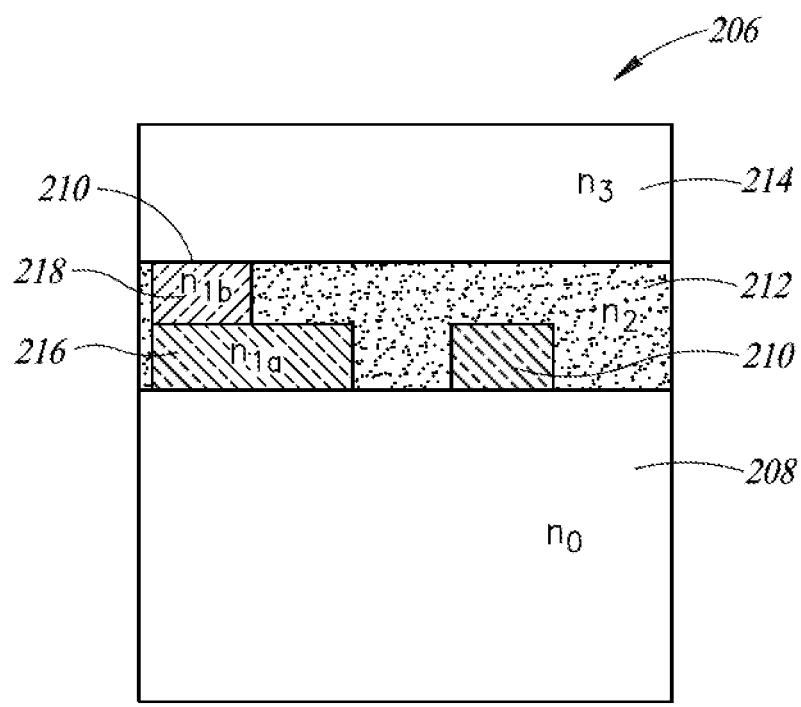
FIG. 18 is a cross-sectional view of a portion of an optical lens according to another embodiment disclosed herein.

FIG. 18 is a cross-sectional view of a portion of an optical lens 206 according to another embodiment. The optical lens 206 includes a substrate 208 having a refractive index $n_0$, a microstructure layer 210 having refractive indexes $n_{1a}$ and $n_{1b}$, a protective layer 212 having a refractive index $n_2$, and a coating or air 214 having a refractive index $n_3$. The microstructure layer 210 includes a first layer 216 made of a first material having refractive index $n_{1a}$, and a second layer 218 made of a second material having a refractive index $n_{1b}$. In one embodiment, refractive indexes $n_{1a} \neq n_2$, $n_{1b} \neq n_2$, and $n_{1a} \neq n_0$.

Figure 19:
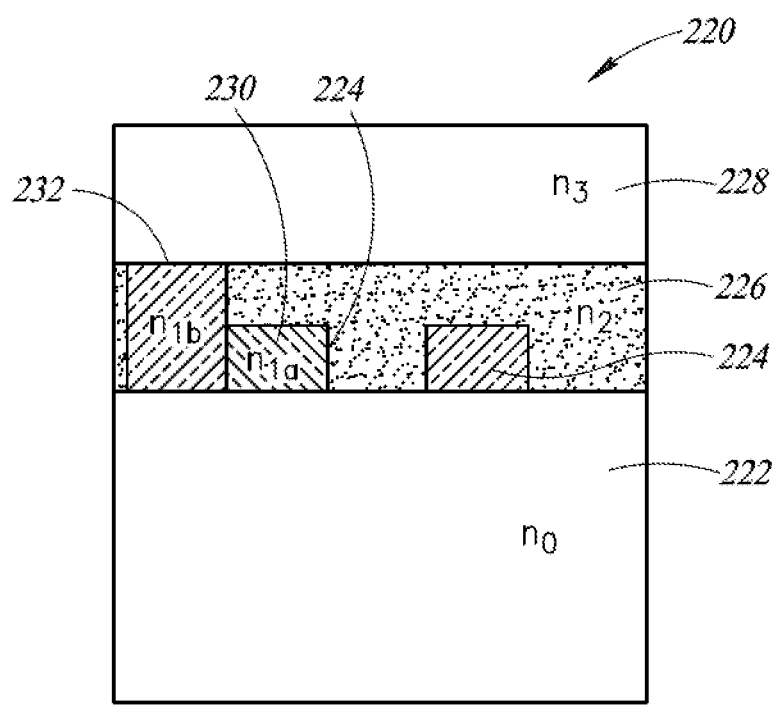
FIG. 19 is a cross-sectional view of a portion of an optical lens according to another embodiment disclosed herein.

FIG. 19 is a cross-sectional view of a portion of an optical lens 220 according to another embodiment. The optical lens 220 includes a substrate 222 having a refractive index $n_0$, a microstructure layer 224 having refractive indexes $n_{1a}$ and $n_{1b}$, a protective layer 226 having a refractive index $n_2$, and a coating or air 228 having a refractive index $n_3$. The microstructure layer 224 includes a first diffractive microstructure 230 made of a first material having refractive index $n_{1a}$, and a second diffractive microstructure 232 made of a second material having a refractive index $n_{1b}$. In one embodiment, refractive indexes $n_{1a} \neq n_2$, $n_{1b} \neq n_2$, and $n_{1a} \neq n_0$, $n_{1b} \neq n_0$, and $n_{1b} \neq n_3$.

Figure 20:
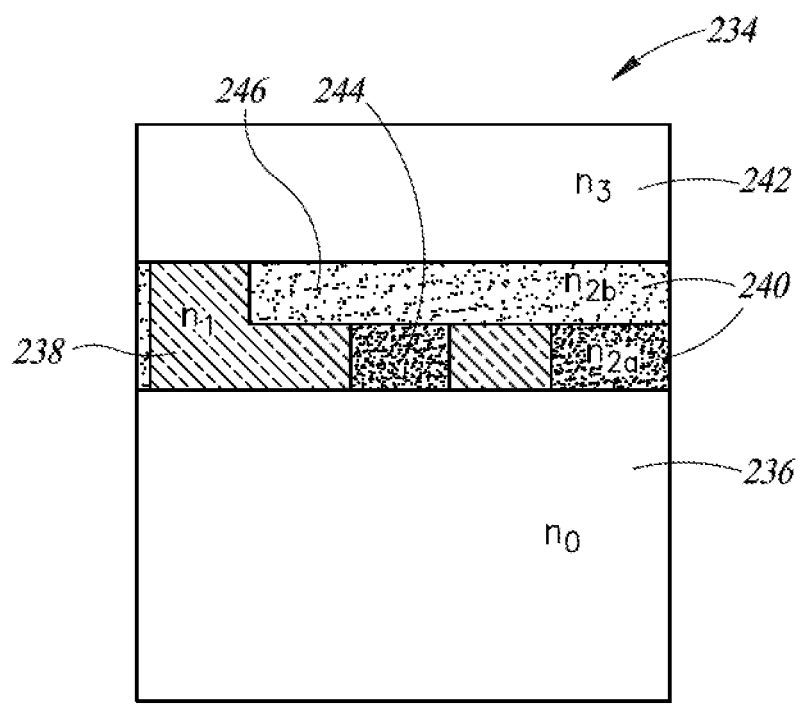
FIG. 20 is a cross-sectional view of a portion of an optical lens according to another embodiment disclosed herein.

FIG. 20 is a cross-sectional view of a portion of an optical lens 234 according to another embodiment. The optical lens 234 includes a substrate 236 having a refractive index $n_0$, a microstructure layer 238 having a refractive index $n_1$, a protective layer 240 having refractive indexes $n_{2a}$ and $n_{2b}$, and a coating or air 242 having a refractive index $n_3$. The protective layer 240 includes a first layer 244 made of a first material having refractive index $n_{2a}$, and a second layer 246 made of a second material having a refractive index $n_{2b}$. In one embodiment, refractive indexes $n_1 \neq n_{2a}$, $n_1 \neq n_{2b}$, $n_1 \neq n_0$, and $n_1 \neq n_3$.

Figure 21:
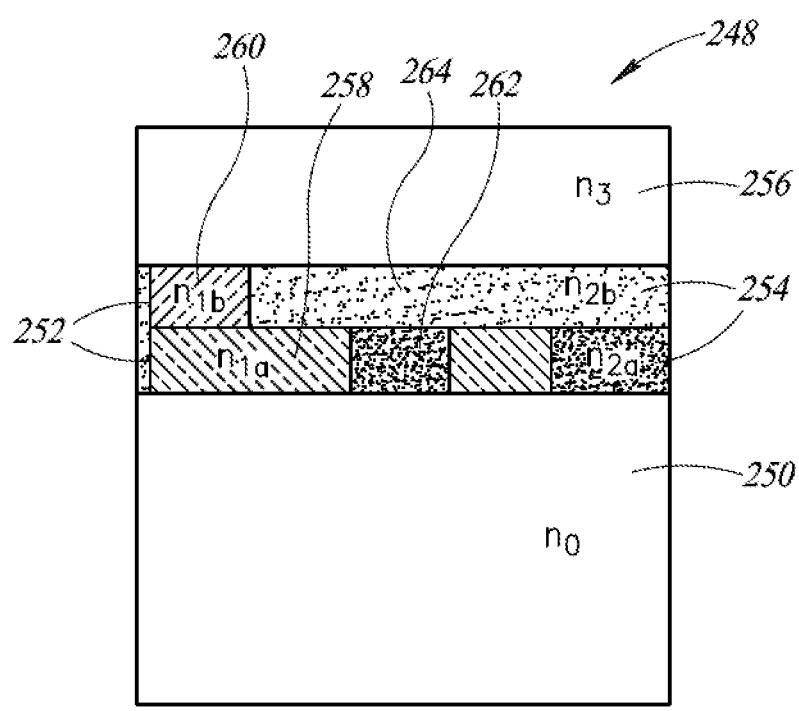
FIG. 21 is a cross-sectional view of a portion of an optical lens according to another embodiment disclosed herein.

FIG. 21 is a cross-sectional view of a portion of an optical lens 248 according to another embodiment. The optical lens 248 includes a substrate 250 having a refractive index $n_0$, a microstructure layer 252 having refractive indexes $n_{1a}$ and $n_{1b}$, a protective layer 254 having refractive indexes $n_{2a}$ and $n_{2b}$, and a coating or air 256 having a refractive index $n_3$. The microstructure layer 252 includes a first layer 258 made of a first material having refractive index $n_{1a}$, and a second layer 260 made of a second material having a refractive index $n_{1b}$. The protective layer 254 includes a first layer 262 made of a first material having refractive index $n_{2a}$, and a second layer 264 made of a second material having a refractive index $n_{2b}$. In one embodiment, refractive indexes $n_{1a} \neq n_{2a}$, $n_{1a} \neq n_{2b}$, $n_{1b} \neq n_{2b}$, and $n_{1a} \neq n_0$.

In accordance with one or more embodiments, the optical lens disclosed herein may have a diffractive function that is set by selecting materials with different reflective indexes for the anti-reflective microstructure layer and the protective layer. Further, the optical lens disclosed herein provides a robust structure that protects the diffractive microstructures from damage and contamination, is cleanable, and is readily compatible with wafer-to-wafer bonding and direct application of coatings. Moreover, the method of making the optical lens disclosed herein is capable of fabricating wafer level diffractive microstructures with high precision and accuracy.

The embodiments of the present disclosure provide precision control of heights and widths of microstructures formed on a wafer, such as a glass wafer. The microstructures are formed from a separate material from the wafer as opposed to being formed or etched into the wafer. Use of a different material provides for optimizing diffraction. The refractive indices of the materials can be selected to give diffractive properties for a particular application. These microstructures are very small, in the range of 0.05 and 10 microns. Without inclusion of the protective layer that has a planar surface, these features may be susceptible to contamination.

Using semiconductor processing techniques provides precision alignment and shapes to make very specific diffractive microstructures for specific applications. In some embodiments, the protective layer can be formed using a spin on material, such as an epoxy.

In accordance with one or more embodiments, the optical lens disclosed herein may include an anti-reflective diffractive microstructure layer that is configured to simultaneously modulate light that propagates through the diffractive microstructures by diffraction and minimize reflection of light from the optical lens.

The present disclosure includes a lens that has a substrate with a first surface and a second surface. The lens includes a first anti-reflective coating with diffractive microstructures on the first surface of the substrate and a second anti-reflective coating with diffractive microstructures on the second surface of the substrate. A first protective layer in on the first anti-reflective coating and a second protective layer is on the second anti-reflective coating. A third anti-reflective layer is on the first protective layer and a fourth anti-reflective layer is on the second protective layer. The first and second anti-reflective layers may be a different material having different refractive indices. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lens, comprising:
   a substrate;
   a plurality of microstructures on the substrate, the plurality of microstructures having a plurality of different heights and widths, each of the plurality of microstructures including:
      a plurality of portions of a first material having a first refractive index; and
      a plurality of coatings that are optical filter coatings or anti-reflective coatings, the plurality of portions being spaced apart from the substrate by one of the plurality of coatings, each of the plurality of portions being spaced from another portion of the plurality of portions by a respective coating of the plurality of coatings; and
   a protective layer on the plurality of microstructures, the protective layer being a second material having a second refractive index that is different from the first refractive index.

2. The lens of claim 1 wherein at least two of the plurality of microstructures are separated from each other by the protective layer.

3. The lens of claim 1 wherein an upper surface of the protective layer is substantially planar.

4. The lens of claim 1 wherein the protective layer comprises at least one of silicon dioxide, silicon nitride, aluminum oxide, or epoxy.

5. The lens of claim 1 wherein the substrate is a borosilicate glass wafer having a refractive index of about 1.46 for an incident wavelength of 940 nm, the plurality of microstructures include poly-crystalline silicon having a refractive index of about 3.5 for an incident wavelength of 940 nm, and the protective layer includes silicon dioxide having a refractive index of about 1.45 for an incident wavelength of 940 nm.

6. The lens of claim 1 wherein the protective layer is silicon nitride.

7. The lens of claim 1, further comprising an optical barrier layer on a plurality of optically inactive regions adjacent to the plurality of microstructures.

8. The lens of claim 7 wherein the optical barrier layer is a metal layer.

9. The lens of claim 1 wherein the substrate has a thickness within a range from 200 μm to 220 μm, and the plurality of microstructures have a thickness within a range from 10 nm to 1000 nm.

10. A lens, comprising:
    a substrate;
    a plurality of microstructures on the substrate, the plurality of microstructures having a plurality of different heights and widths, each of the microstructures including;
       a first coating on the substrate;
       a first portion on the first coating;
       a second coating on the first portion; and
       a second portion on the second coating, the first portion and the second portion having a first refractive index, the first coating and the second coating being optical filter coatings or anti-reflective coatings; and
    a protective layer on the plurality of microstructures, the protective layer having a second refractive index that is different from the first refractive index.

11. The lens of claim 10 wherein at least two of the plurality of microstructures are separated from each other by the protective layer.

12. The lens of claim 10, wherein at least one of the microstructures includes:
    a third coating on the second portion, the third coating being an optical filter coating or an anti-reflective coating; and
    a third portion on the third coating, the third portion having the first refractive index.

13. A lens, comprising:
    a first layer;
    a plurality of microstructures on the first layer, the plurality of microstructures having a plurality of different heights and widths, each of the plurality of microstructures including:
       a first coating on the first layer;
       a first microstructure portion on the first coating, the first microstructure portion having a first refractive index;
       a second coating on the first microstructure portion, the first coating and the second coating being optical filter coatings or anti-reflective coatings;
       a second microstructure portion on the second coating, the second microstructure portion having the first refractive index; and
    a protective layer on the plurality of microstructures, the protective layer having a second refractive index that is different from the first refractive index.

14. The lens of claim 13 wherein at least two of the plurality of microstructures are separated from each other by the protective layer.

15. The lens of claim 13, wherein an upper surface of the protective layer is substantially planar.

\* \* \* \* \*